United States Patent
Aoki et al.

(10) Patent No.: US 6,909,893 B2
(45) Date of Patent: Jun. 21, 2005

(54) WIRELESS COMMUNICATION SYSTEM, FIXED BASE STATION AND MOBILE TERMINAL STATION

(75) Inventors: Yutaka Aoki, Nisshin (JP); Minoru Okada, Nagoya (JP); Masayuki Fujise, Yokosuka (JP); Hiroshi Harada, Yokosuka (JP)

(73) Assignees: Denso Corporation, Kariya (JP); National Institute of Information and Communications Technology, Tokyo (JP)

( * ) Notice: Subject to any disclaimer, the term of this patent is extended or adjusted under 35 U.S.C. 154(b) by 730 days.

(21) Appl. No.: 09/804,475

(22) Filed: Mar. 13, 2001

(65) Prior Publication Data

US 2002/0002045 A1 Jan. 3, 2002

(30) Foreign Application Priority Data

Mar. 15, 2000 (JP) ......................................... 2000-072387

(51) Int. Cl.[7] ................................................. H04Q 7/20
(52) U.S. Cl. ........................ 455/422.1; 455/73; 340/905
(58) Field of Search ............................... 455/73, 422.1, 455/3.01, 517, 562.1, 449, 522; 340/905, 933, 917, 928, 5.61, 10.1–10.6; 235/284

(56) References Cited

U.S. PATENT DOCUMENTS

| | | | |
|---|---|---|---|
| 4,182,989 A | * | 1/1980 | Endo et al. .................. 455/524 |
| 4,311,876 A | | 1/1982 | Endo et al. |
| 5,058,201 A | | 10/1991 | Ishii et al. |
| 5,406,275 A | * | 4/1995 | Hassett et al. ............... 340/933 |
| 5,504,936 A | * | 4/1996 | Lee ............................. 455/436 |
| 5,918,181 A | * | 6/1999 | Foster et al. ............. 455/456.1 |
| 6,130,626 A | * | 10/2000 | Kane et al. .................. 340/905 |
| 6,326,926 B1 | * | 12/2001 | Shoobridge et al. ........ 343/702 |
| 6,330,447 B1 | * | 12/2001 | Hengeveld .................. 455/436 |
| 6,359,871 B1 | * | 3/2002 | Chung et al. ............... 370/338 |
| 6,370,377 B1 | | 4/2002 | Take et al. |
| 6,470,182 B1 | * | 10/2002 | Nelson ..................... 455/432.1 |

FOREIGN PATENT DOCUMENTS

| | | |
|---|---|---|
| EP | 0 843 380 A2 | 11/1997 |
| JP | A-S55-143854 | 11/1980 |
| JP | A-S61-216537 | 9/1986 |
| JP | 404105083 A * | 4/1992 |
| JP | A-H04-157820 | 5/1992 |
| JP | A-H04-207532 | 7/1992 |
| JP | A-H05-136724 | 6/1993 |
| JP | 5-307697 | 11/1993 |
| JP | 6-350503 | 12/1994 |
| JP | 8-79164 | 3/1996 |
| JP | 9-167990 | 6/1997 |
| JP | 9-238104 | 9/1997 |
| JP | A-H11-146464 | 5/1999 |

OTHER PUBLICATIONS

Yoshioka et al., "Proposal of High Efficiency Data Transmission Technology for Spot Communication System," *Technical Report of IEICE*, pp. 91–98, Jan. 2000.

* cited by examiner

*Primary Examiner*—Marsha D. Banks-Harold
*Assistant Examiner*—Nghi H. Ly
(74) *Attorney, Agent, or Firm*—Posz Law Group, PLC

(57) ABSTRACT

A radio communication system between a mobile terminal station of a vehicle and a plurality of roadside fixed base stations is so constructed that communication areas of the base stations do not overlap with each other and satisfy the following two conditions. Condition (i): each communication area is defined so that there cannot be a plurality of terminal stations simultaneously. Condition (ii): it is needless to perform multiple access such as time division in the communication area and capable of affording the whole band and all the communication time allocated to one communication area to one terminal station and broad band communication becomes possible. Thus, each mobile terminal station can utilize all the frequency band allocated for service.

39 Claims, 15 Drawing Sheets

| MODULATION | AVERAGE BER |
|---|---|
| FSK | $P_{FSK} = \text{erfc}\left(\frac{K_0}{\sqrt{2}}\right)$ |
| BPSK | $P_{BPSK} = \frac{1}{2}\text{erfc}\left(\frac{K_0}{\sqrt{2}}\right)$ |
| QPSK | $P_{QPSK} = \frac{1}{2}\text{erfc}\left(\frac{K_0}{\sqrt{2}}\right)$ |
| 16QAM | $P_{16QAM} = \frac{3}{8}\text{erfc}\left(\frac{K_0}{\sqrt{10}}\right)$ |
| 64QAM | $P_{64QAM} = \frac{7}{24}\text{erfc}\left(\frac{K_0}{\sqrt{42}}\right)$ |
| 256QAM | $P_{256QAM} = \frac{15}{64}\text{erfc}\left(\frac{K_0}{\sqrt{170}}\right)$ |

| PARAMETER | VALUE | |
|---|---|---|
| | SPOT | CONTINUOUS |
| POWER | 10 dBm | |
| ANTENNA GAIN | 20 dB | 3 dB |
| DISTANCE | 10 m | |
| FREQUENCY | 37 GHz | |
| MODULATION | FSK, BPSK, QPSK | |
| AVERAGE BER | $1 \times 10^{-6}$ | |
| RECEIVER NOISE | 10 dB | |
| TEMPERATURE | 300 K | |
| BANDWIDTH | 1 - 200 MHz | |

WIRELESS COMMUNICATION SYSTEM, FIXED BASE STATION AND MOBILE TERMINAL STATION

CROSS REFERENCE TO RELATED APPLICATION

This application is based on and incorporates herein by reference Japanese patent application Ser. No. 2000-72387 filed Mar. 15, 2000.

BACKGROUND OF THE INVENTION

The present invention relates to a wireless communication system capable of a broad band package data transmission between mobile terminal stations carried by vehicles and fixed base stations fixedly provided along a traveling route of the vehicles, for example, between vehicles and a roadside.

As a wireless communication technology in the field of mobile communication, cellular communication systems such as PDC (Personal Digital Cellular) have already been realized. In PDC, service area is divided into a lot of wide radio wave zone referred to as a cell which is a macro cell having a radii of 0.5 km–20 km, and a fixed radio base station (BS) is installed in the center of each cell as shown in FIG. 15A. Due to the macro cell structure, only a small number of base stations are required in comparison with the micro cell having a radii of 0.1 km–0.5 km for PHS (Personal Handy-phone System). Thus, the infrastructure cost is improved. In addition, each cell has a part overlapping with adjacent cells to realize continuous type communication. Because of this, the terminal station (mobile station) can carry out communications without interruption.

However, since each cell has a part overlapping with adjacent cells as shown in FIGS. 15A and 15C, it is required to change the carrier frequency to be different from those of the adjacent cells to prevent radio interference. Therefore, the whole frequency ranges (810 MHZ–826 MHz, 1429 MHz–1453 MHz) given to service (PDC) is required to be divided and allocated to each cell. Specifically, the carrier frequency is divided into seven frequencies f1–f7 as shown in FIG. 15A. The frequency band which individual user can use becomes narrow in comparison with the whole band. As a result, the transmissible data rate decreases.

Moreover, since each cell is allocated relatively wide area, multiple access is adopted to cope with the situation wherein a plurality of users— mobile terminals exist in the cell. This results in need for the division of access time to be allocated to each user, for instance, Time Division Multiple Access (TDMA) shown in FIG. 15B, Frequency Division Multiple Access (FDMA), or Code Division Multiple Access (CDMA). As a result, the average data transmission rate decreases.

Thus, the application of a cellular communication system to the communication between the a vehicle and a roadside causes a decrease of communication resources such as time and frequency allocated to each user so that the realization of broad band data transmission becomes difficult.

SUMMARY OF THE INVENTION

Thus, it is an object of the invention to enable realization of broad band data transmission between vehicles and a roadside.

According to the invention, a wireless communication system comprises a plurality of base stations and a mobile terminal station carried by vehicles. The base stations are separated from each other by a predetermined distance along a traveling route of the vehicle and has respective communication areas. Each communication area of the base stations is sized to cover generally only one vehicle to exist therein and the communication areas are separated from one another without overlapping.

BRIEF DESCRIPTION OF THE DRAWINGS

The above and other objects, features and advantages of the invention will become more apparent from the following detailed description made with reference to the accompanying drawings. In the drawings.

DETAILED DESCRIPTION OF THE PREFERRED EMBODIMENT

Figure 1A:
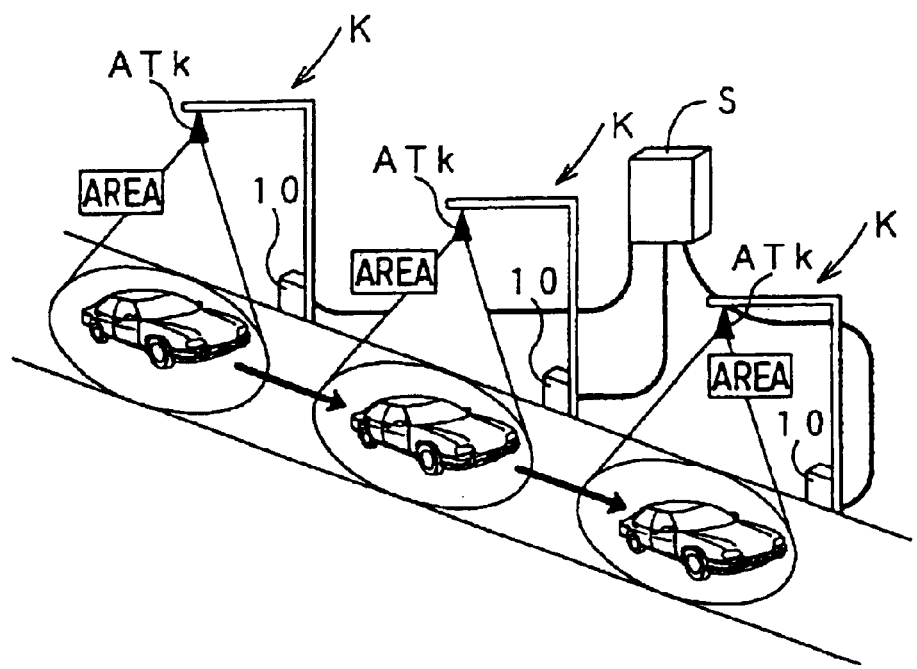
FIG. 1A shows a communication system between a vehicle and a roadside according to an embodiment of the invention.
Figure 1B:
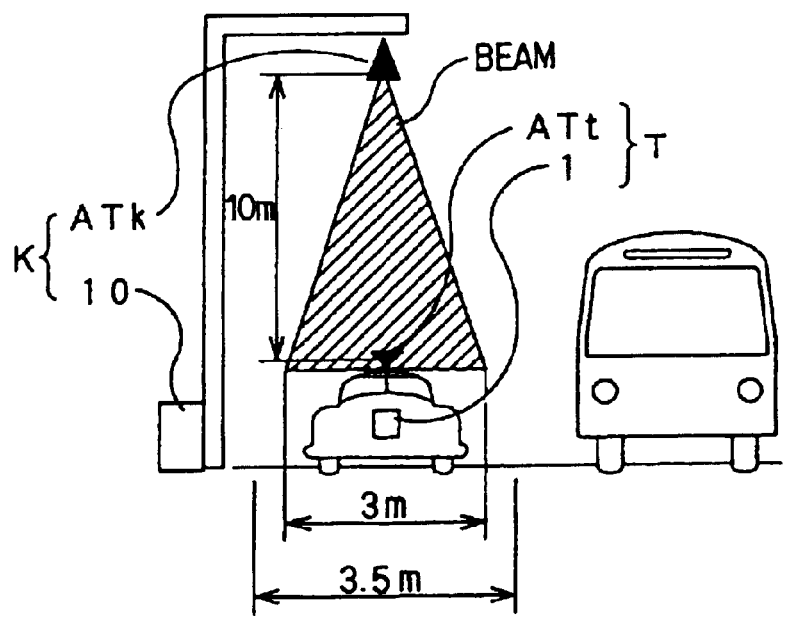
FIG. 1B shows a communication area in the embodiment.

Referring first to FIGS. 1A and 1B, a communication system comprises a plurality of base stations K fixedly arranged with predetermined distance along a road and a mobile terminal station T mounted in and carried by a vehicle running on the road.

The terminal station T comprises an antenna (terminal station antenna) ATt installed in the upper part of a vehicle and a terminal station device 1 for wireless communication through the terminal station antenna ATk.

On the other hand, each base station K comprises an antenna (base station antenna) ATk provided above the road and a base station device 10 for wireless communication through the base station antenna ATk. In addition, the base station devices 10 are connected to a control station S through optical fibers.

The base station K emits carrier wave beam from the base station antenna ATk to form a predetermined communication area so that radio communication is performed between the terminal station T which entered into the communication area. The terminal station T carried by a vehicle comes in or goes out the communication area intermittently while traveling, and the vehicle traveling in the communication area carries out data communications with the base station K. Here, the communication area formed by the base station K is set to satisfy the following two conditions.

(i) It is a size in which a plurality of terminals cannot exist simultaneously. Specifically, it is an area (referred to as personal area) having a size of the extent in which at most one vehicle carrying the terminal station T can be included.

(ii) It is so composed such that the communication area does not overlap with each other.

In the communication area set to satisfy such two conditions, the terminal station T and the base station K communicate with each other. The above communication method is called as a spot access method. This spot access method provides the following features.

At first, multiple access such as time division or frequency division etc. need not be executed in the communication area due to the above condition (i). Consequently, the whole band and all the communication time allocated to one communication area can be provided exclusively for one terminal station T so that a broad band communication becomes possible. In addition, all the communication areas can use the same frequency band and the whole frequency band given to one service can be utilized in every communication area. Consequently, each terminal T of the user can use the whole frequency band given to service so that broad band communication becomes possible.

The size or the formation approach of the communication area or the carrier frequency is described in further detail.

(1) The actual size of the communication area that satisfies the condition (i) is examined. The vehicle being the object of communication between a vehicle and a roadside has a wide variety from large-sized motor lorry to medium-sized or compact-sized automobile. However, if the size of communication area satisfies the condition with respect to the medium-sized or the compact-sized automobile, the condition (i) is satisfied by the vehicle larger than those by all means and so here is examined about the medium-sized or the compact-sized automobile. At first, an example of vehicle and its size is shown as follows.

| [Vehicle type] | [length (m)] | [width (m)] | [height (m)] |
| --- | --- | --- | --- |
| Medium-sized A | 4.9 | 1.8 | 1.5 |
| Medium-sized B | 4.8 | 1.8 | 1.5 |
| Compact-sized automobile | 3.4 | 1.5 | 1.4 |

It is found that the length of vehicle along traveling direction is around 4 m. Assuming the length of communication area along vehicle traveling direction is not more than 4 m, it may be concluded that two or more vehicle cannot be contained in one communication area during not only in traveling but also in congestion. Thus, a plurality of terminal stations T do not exist in the communication area simultaneously. In addition, overall length of a vehicle along widthwise direction is found out to be within around 2 m. However, since the vehicle may not always run on the middle of each traffic lane, the length of communication area along vehicle widthwise direction is supposed to have preferably a width of road extent (3.5 m). However, since it causes interference if it is spread to the adjacent traffic lane, around 3 m with the margin of around 10% on both sides of a road is thought to be desirable. Therefore, the size of the communication area is determined to have 4 m length (along road lengthwise direction)×3 m width (along road widthwise direction).

In addition, the area of 4 m×3.5 m is, as shown in FIG. 1B, set to have the above size in the position of terminal station antenna ATt installed in the upper part of the vehicle. Therefore, in view of the above vehicle size samples, no other choice may be left but to set so as to secure the size of the above communication area of 1.4 m–1.5 m above the road.

In addition, as for the geometry of communication area (horizontal cross-sectional shape), generally ellipse geometry is easy to form. However, since the communication object is a vehicle, the following advantages are provided by making the geometry rectangle-shaped. That is, same period of time while the terminal station antenna ATt stays in the longitudinal span of 4 m can be secured regardless of the traveling position of the vehicle in a traffic lane. Therefore, though generally ellipse geometry is adopted for the sake of concept description in FIG. 1A, it is desirable to emit a beam having generally rectangle-shaped cross section in practice as shown by hatched lines in FIGS. 2A–2C.

Figure 2A:
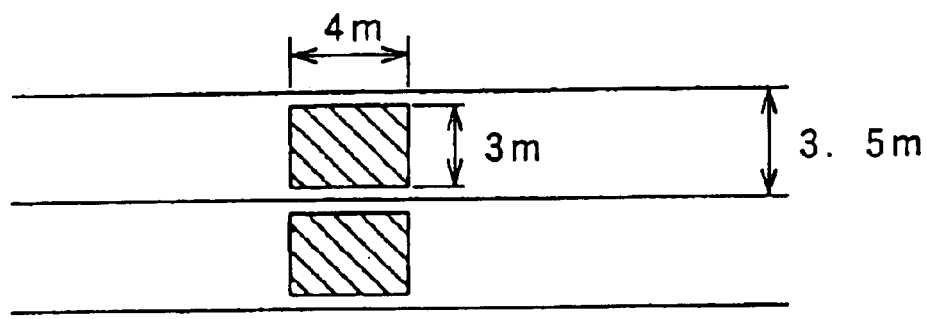
FIGS. 2A–2C show arrangements and sizes of communication areas for a plurality of traffic lanes.

The communication area having a width of 3 m is set in consideration of the interference with the communication area over the adjacent traffic lane. Though there might be a plurality of traffic lanes, there exists a case in which the plurality of traffic lanes abut each other without any intervention or a case in which there exists something like medial strip that makes the traffic lanes not contact directly. As shown in FIG. 2A, in a case that a plurality of traffic lanes is adjacent directly and that the communication area is formed adjacent to each other along the widthwise direction, it is desirable to adopt around 3 m that brings a margin instead of adopting the full width of 3.5 m for the purpose of preventing the interference between both communication areas.

Figure 2B:
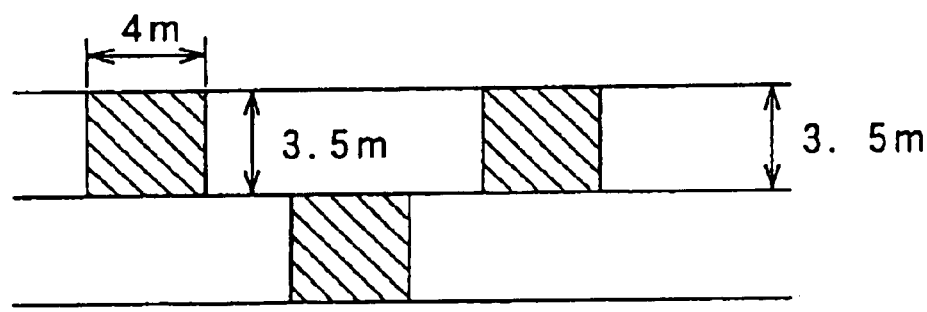

However, even in the case that a plurality of traffic lanes is adjacent directly, the positions of communication areas are preferably offset mutually so as not to abut each other along the widthwise direction of the road, as shown in FIG. 2B. In this instance, despite the scattering of the carrier wave by a vehicle existing in one communication area, for example, the influence exerted to another communication area may be minimized so that the area can have a full width of 3.5 m. In addition, although the communication areas in two lanes shown in FIG. 2B are disposed alternately in the traveling direction, they may be arranged to align in the widthwise direction in case that the position has an offset along the widthwise direction.

Figure 2C:
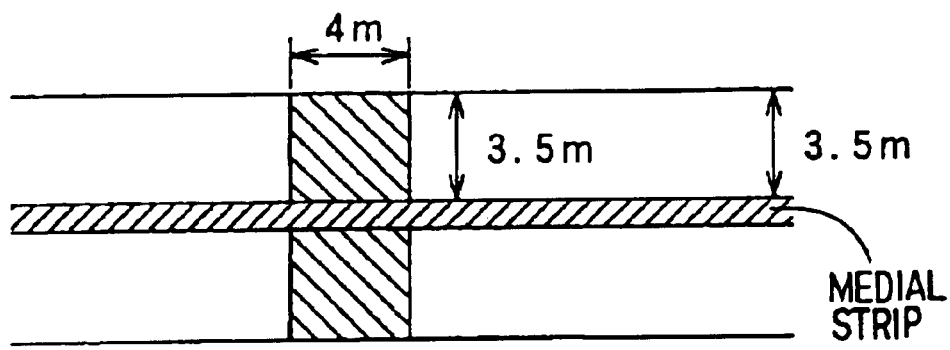

On the other hand, as shown in FIG. 2C, in case that there exists a medial strip that separates the traffic lanes not to contact directly, it is of course possible that the communication area has the width of 3.5 m that is equal to the full width of a road.

(2) Regarding the carrier frequency, the directivity of the carrier frequency becomes higher when it is increased.

Therefore, as for the carrier frequency, higher frequency is desirable for forming a personal communication area. In addition, if the condition (ii) is satisfied, in case the frequency is low like in microwave band, the interference is produced by diffraction or scattering on the road surface or a vehicle. Thus, it is desirable to use a millimeter wave having a high directivity to a sufficient degree and a large attenuation in the atmospheric air.

(3) Regarding the position of the antenna, the widthwise direction and the vehicle traveling direction must be taken into consideration.

When using a millimeter wave as the carrier wave, the rectilinear propagation nature becomes high. Thus, it sometimes happens that the carrier wave is obstructed (shadowed) by a large automobile (for example, running on the adjacent driving lane) near by the vehicle of own or signposts. In order to avoid this, as for the road widthwise direction, it is desirable to emit the carrier beam from approximately right above the terminal station antenna ATt installed in the upper part of the vehicle as shown in FIG. 1B.

Figure 3A:
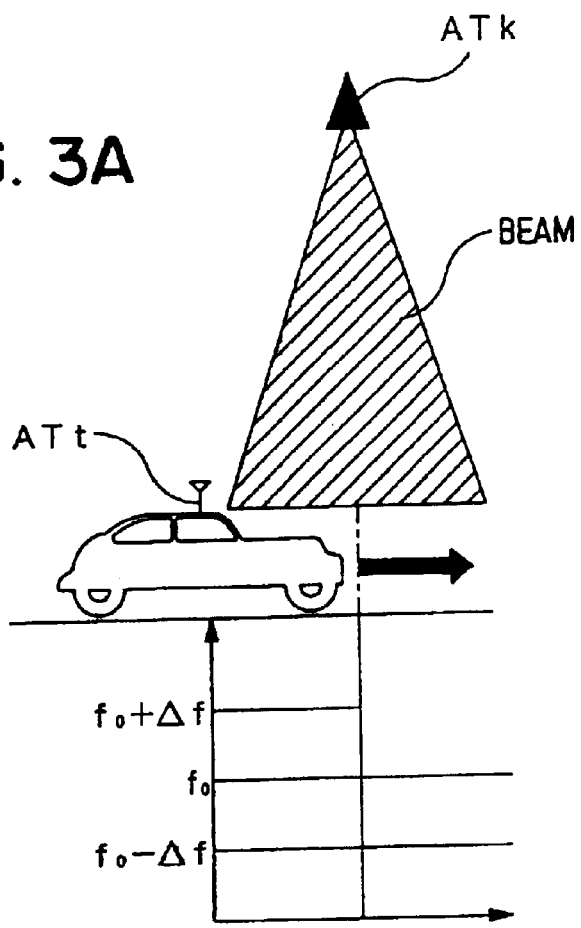
FIGS. 3A and 3B show formation of communication areas along vehicle traveling direction.

In addition, as for the traveling direction, it is also desirable to emit from approximately right above the vehicle. However, in case of forming the beam in symmetry along back-and-forth direction of the vehicle on the road from right beneath the base station antenna ATk, due to Doppler effect as shown in FIG. 3A the carrier frequency varies in discontinuity (f0+Δf→f0−Δf) before and after the terminal station antenna ATt passes right under the base station antenna ATk with the traveling of the vehicle.

Figure 3B:
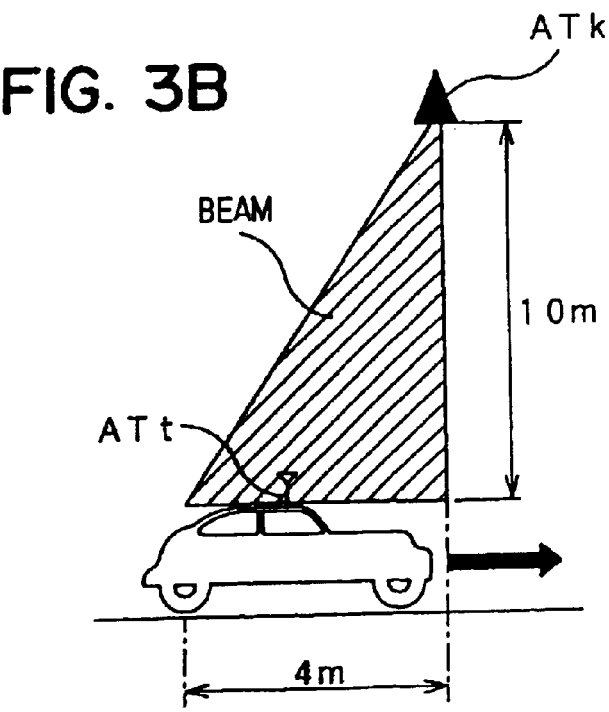

Therefore, in the present embodiment, the beam is formed from right beneath the base station antenna ATk to only the rear side (opposite side to the traveling direction of a vehicle) as shown in FIG. 3B. Alternatively, the beam may be emitted from right beneath the base station antenna ATk to only the front side (the traveling direction side as opposed to the case shown in FIG. 3B. As for the height of the beam, it is set to around 10 m in the present embodiment. It may be changed appropriately corresponding to the situation of the application.

(4) As the present system adopts the spot access communication method, it has an advantage of realizing a broader band communication (larger volume data communication) than the continuous access method such as for example conventional cellular communication system. If the distance between the communication area is shortened, it can of course carry out a broader band communication than the continuous access method. However, the infrastructure cost becomes high if the number of the base stations K increases. Therefore, the following inspection is made by means of numerical calculation about the extent how long the distance of the communication area can be extended for keeping the advantage against the continuous access method.

(4-1) Transmission Gain of the Base Station Antenna ATk

As for the communication area, beam profile such as shown by hatched lines in FIG. 1B and FIG. 3B is used. The horizontal cross section of the beam at the position of the terminal station side antenna ATt has a rectangle shape of 4 m long×3 m area. The base station antenna gain $G_{tSA}$ [dB] of this case can be determined by following expression.

$$G_{tSA} = 10\log_{10}(4\pi d^2/A)$$

Figure 15A:
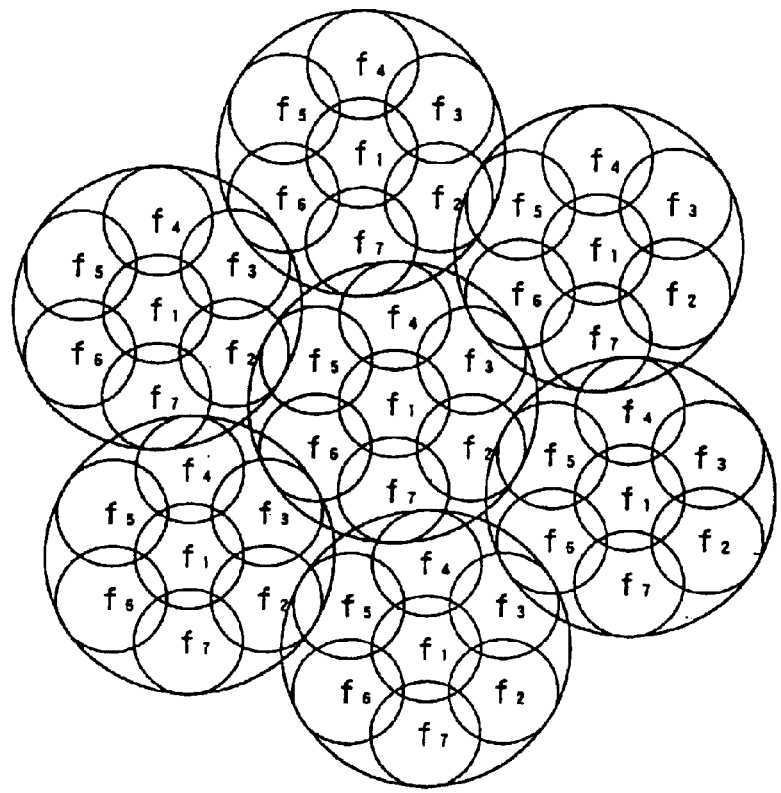
FIGS. 15A–15C show a continuous access method as a related art.
Figure 15B:
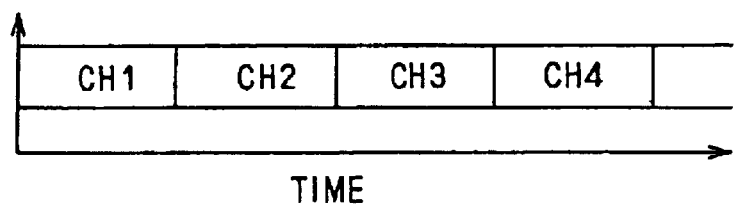
Figure 15C:
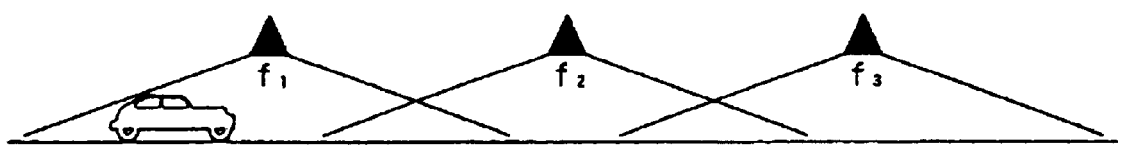

Here, d [m] is the propagation distance, A [m²] is the area of the communication area at the height of the terminal station antenna ATt. Base station antenna gain of this system can be estimated to be 20 dB by substituting d=10 m, A=4 m×3 m=12 m². As compared with this, the base station antenna gain $G_{tCN}$ of the continuous access method is estimated to be 3 dB by substituting the irradiation area A=½×4πd² derived from the fact that the beam is emitted in half plane as shown in FIG. 15C.

(4-2) Broad Band Communication Characteristics of the Spot Access Method

Numerical calculation for the broad band communication characteristics by the spot access method in comparison with the continuous access method is performed about the case in which data is transmitted from the base station and received by the apparatus carried by the vehicle.

Figure 5:
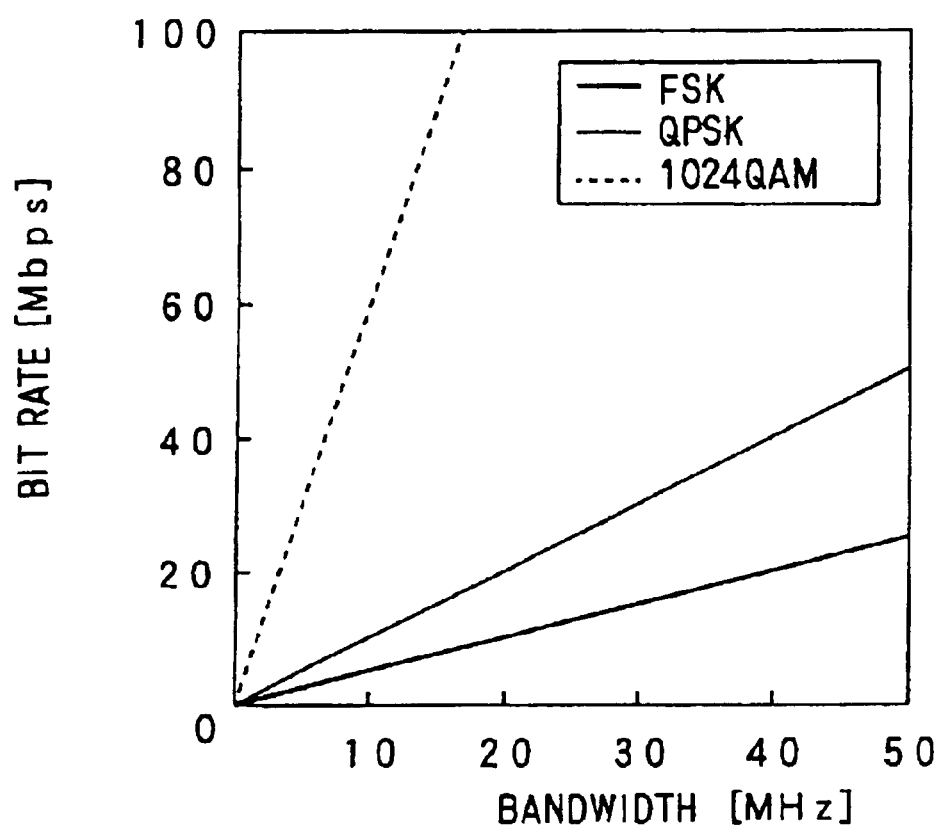
FIG. 5 shows a relationship between data transmission rate and necessary bandwidth.

Generally, it is known that the necessary bandwidth increases as the data transmission rate (velocity) increases. In addition, the relationship among three modulation system of QPSK and 1024QAM is shown in FIG. 5. In addition, as the band increases, the reception noise increases so that CNR (Carrier to Noise power Ratio) of the received wave lessens. CNR and average BER of the received wave is in on-to-one correspondence and average BER becomes worse in accordance with the lessening of CNR. Therefore, CNR is determined uniquely (requied CNR) as opposed to average BER required by the system. If other channel condition (radiation power, propagation loss, antenna gain or etc.) is kept in a fixed condition, broad band characteristics can be evaluated according to the extent of the bandwidth that the electric power margin can be afforded.

Figures 6A, 6B:
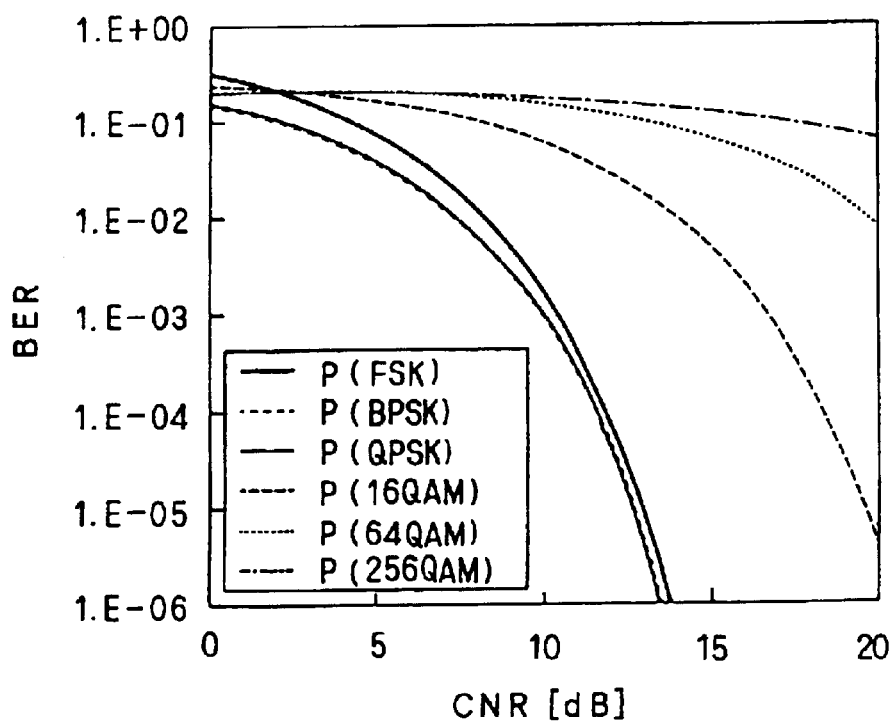
FIGS. 6A and 6B show a relationship between average BER and CNR in each modulation system.

Thus, at first, the relationship between CNR and average BER is calculated according to each modulation system (six systems of FSK, BPSK, QPSK, 16QAM, 64QAM, 256QAM). In case the average BER is small, the relationship between CNR and average BER is shown in FIG. 6A. In addition, K0 used in the expression of average BER of FIG. 6A is the square root of true value of CNR. Executing the operation shown in FIG. 6A, calculation results shown in FIG. 6B are provided. From these results, average BER increases as CNR decreases. In case that BER required in the system, for example, is 1×10⁻⁶, CNR of 14 dB is required for FSK, BPSK and QPSK.

Next, the broad band communication characteristics described as above is calculated. When the electric power margin is M [dB] and CNR provided as a result of the propagation is $CNR_{SA}$ [dB] and CNR required by the system is $CNR_0$ [dB], the following relation is derived.

$$M = CNR_{SA} - CNR_0$$

Here, $CNR_{SA}$ [dB] can be expressed as follows, where $P_{rSA}$ [dBm] is the propagation electric power and N [dBm] is the noise power.

$$CNR_{SA} = P_rSA - N$$

This $P_{rSA}$ [dBm] can be expressed as follows, where $P_t$ [dBm] is the base station radiation power and $G_{tSA}$ [dB] is the gain of base station antenna ATk and $G_r$ [dB] is the gain of terminal station antenna $AT_t$ and $G_{prop}$ [dB] is the propagation transmission gain.

$$P_{rSA} = P_t + G_{tSA} + G_r + G_{prop}$$

In addition, $G_{prop}$ [dB] can be expressed as follows, where d [m] is the propagation distance and f [Hz] is the carrier frequency and c [m/sec] is the velocity of light.

$$G_{prop} = -20\log_{10}(4\pi df/c)$$

Finally, Noise power N [dBm] can be expressed as follows, where kB [J/K] is Boltzmann constant and T [K] is the temperature of terminal station side and $B_{wSA}$ [Hz] is bandwidth and NF [dB] is the noise figure of the receiver.

$$N=10\log_{10}(k_B \cdot T \cdot B_{wSA} \cdot 10^3)+NF \quad\quad 5$$

From the above relationship, the relationship between the margin M and the possible bandwidth $B_{wSA}$ in the case of the system according to the spot access method is derived as follows.

$$M = CNR_{SA} - CNR_0 \quad\quad \text{[Equation 1]}$$

$$\Leftrightarrow M = (P_{rSA} - N) - CNR_0$$

$$\Leftrightarrow M = ((P_t + G_{tSA} + G_r + G_{prop}) - N) - CNR_0$$

$$\Leftrightarrow M = \left(\left(P_t + G_{tSA} + G_r - 20\log\frac{4\pi df}{c}\right) - N\right) - CNR_0$$

$$\Leftrightarrow M = \left(\left(P_t + G_{tSA} + G_r - 20\log\frac{4\pi df}{c}\right) - (10\log(k_B T B_{wSA} 10^3) + N_F)\right) - CNR_0$$

$$\Leftrightarrow \log(k_B T B_{wSA} 10^3) = \frac{P_t + G_{tSA} + G_r - 20\log\frac{4\pi df}{c} - N_F - CNR_0 - M}{10}$$

$$\Leftrightarrow k_B T B_{wSA} 10^3 = 10^{\frac{P_t + G_{tSA} + G_r - 20\log\frac{4\pi df}{c} - N_F - CNR_0 - M}{10}}$$

$$\Leftrightarrow B_{wSA} = \frac{10^{-3}}{k_B T} 10^{\frac{P_t + G_{tSA} + G_r - 20\log\frac{4\pi df}{c} - N_F - CNR_0 - M}{10}}$$

On the other hand, with respect to the continuous access method shown as the related art, the relationship between the margin M and the bandwidth $B_{wCN}$ is also led as follows in an analogous manner.

$$B_{wCN} = \frac{10^{-3}}{k_B T} 10^{\frac{P_t + G_{tCN} + G_r - 20\log\frac{4\pi df}{c} - N_F - CNR_0 - M}{10}} \quad\quad \text{[Equation 2]}$$

Here, $R_{aSA}$ is the transmission rate provided by the spot access method, $R_{aCN}$ is the transmission rate provided by the continuous access method. When the ratio of the transmission rate provided in each access method is defined as $R_{Rate} = R_{aSA}/R_{aCN}$, the following relationship is provided.

$$R_{Rate} = R_{aSA}/R_{aCN} = B_{wSA}/B_{wCN}$$

From the above-mentioned relationship Ratio $R_{Rate}$ of the transmission rate is expressed as follows using the base station antenna gain $G_{tCA}$ of the spot access method and the base station antenna gain $G_{tSN}$ of the continuous access method.

$$R_{Rate} = \frac{B_{wSA}}{B_{wCN}} \quad\quad \text{[Equation 3]}$$

$$\Leftrightarrow R_{Rate} = \frac{\frac{10^{-3}}{k_B T} 10^{\frac{P_t + G_{tSA} + G_r - 20\log\frac{4\pi df}{c} - N_F - CNR_0 - M}{10}}}{\frac{10^{-3}}{k_B T} 10^{\frac{P_t + G_{tCN} + G_r - 20\log\frac{4\pi df}{c} - N_F - CNR_0 - M}{10}}}$$

$$\Leftrightarrow R_{Rate} = 10^{\frac{1}{10}(G_{tSA} - G_{tCN})}$$

SOT section rate E is expressed as follows by using a length Lon [m] of SOT (section on transmitting) and a length Loff [m] of SNT (section not transmitting).

$$E = Lon/(Lon + Loff)$$

Using this effective section rate E, the ratio Rave.Rate of the average data transmission rate of the spot access method to the average data transmission rate of the continuous access method is expressed as follows.

$$R_{ave.Rate} = R_{Rate} \cdot E$$

Here, the condition that the average data transmission rate of the spot access method is superior to the data transmission rate of the continuous access method is $R_{ave.Rate} > 1$. Therefore, it can be developed as follows, with "^" in the following expression being the power of numeric value before "^" to the number of times of the numeric value after "^".

$$R_{ave.Rate} = R_{Rate} \cdot E > 1$$

$$\rightarrow E > 1/R_{Rate}$$

$$\rightarrow E > 10^{\{-(G_{tSA} - G_{tCN})/10\}}$$

That is, by determining the number of communication areas such that SOT communication section ratio E satisfies this expression (for given base station antenna gain), a data transmission rate which is higher than that in the continuous access method can be obtained in the spot access method.

A comparison is made with specific numeric values here. At first, specifications are explained. Radiation power is set to 10 dBm. A base station antenna gain is set to 20 dB for the spot access method and 3 dB for the continuous access method according to the calculation described in (4–1). Propagation distance is set to 10 m assuming the case of right under the antenna, frequency is 37 GHz, and modulation scheme is FSK, BPSK or QPSK. Assuming the required average BER for $1 \times 10^{-6}$ required in the Ethernet of wired communication system, CNR which then is required with the modulation scheme of FSK, BPSK or QPSK in this case is 14 dB according to FIG. 5. The noise figure of the receiving equipment is 10 dB due to the case of millimeter wave and the temperature of the receiving set is set to 300K equal to the room temperature. The above specification is summarized in FIG. 7A.

Figures 7A, 7B:
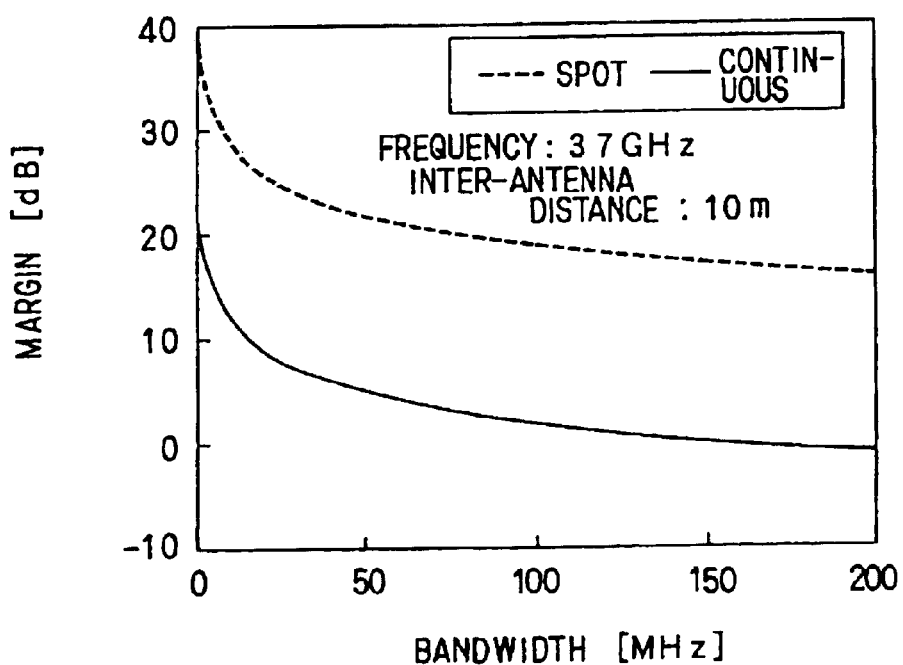
FIGS. 7A and 7B show a comparison of a spot access method and a continuous access method.

The result of the calculation is shown in FIG. 7B. While the electric power margin becomes zero in the vicinity of the bandwidth 70 MHz according to the continuous access method (solid line), the margin according to the spot access method is 16 dB even at the bandwidth of 200 MHz. As the same value of 16 dB can be got only by the bandwidth of 4 MHz according to the continuous access method, the spot access method is thought to have the transmission rate of 50 times as high as that of the continuous access method.

(5) Base Station Arrangement in this System

Figure 8A:
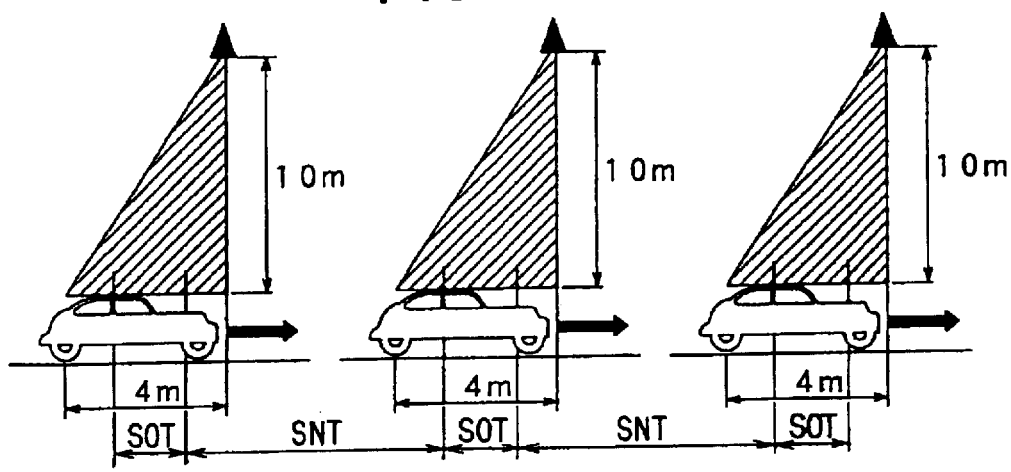
FIG. 8A shows sections on transmitting (SOT) and sections not transmitting (SNT) in spot access method.

As described in (4), it is made clear that under a certain practical condition, the present system of the spot access method has the transmission rate of 50 times as high as that of the continuous access method. However, in the spot access method, as shown in FIG. 8A, there exists a communication-disabled section (SNT: section not transmitting) that does not exist in the continuous access method. Therefore, calculation is performed here about the average transmission rate which varies according to the length of SNT in comparison with the length of SOT so as to lead the condition that can hold high transmission rate in comparison with the continuous access method.

It is assumed as follows in performing the calculation. Among the duration while the terminal station antenna ATt stays in the communication area, the time usable for a desired data transmission is set to 50 percent in consideration of the time needed for controlling. Therefore, among the longitudinal length 4 m (being in coincidence with the direction of the vehicle traveling) of the communication area as mentioned above, SOT length (usable in desired data transmission) is set to 2 m equal to 50 percent. In addition, it is assumed that the vehicle velocity is fixed, and that SOT length and SNT length of the communication area are in one-to-one linear correspondence with the on-time and the off-time of the communication. In addition, electric power margin is set to 16 dB. Then, bandwidth of 200 MHz can be afforded according to the spot access method, but it is 4 MHz according to the continuous access method. As for this bandwidth, in case of the use of FSK as a modulation system, transmission rate of 100 Mbps and 2 Mbps is provided (FIG. 5), respectively.

The average data transmission rate is set in the condition as follows.

$$E = Lon/(Lon + Loff)$$

$$R_{av} = R \cdot E$$

Here, $R_{av}$ [bps] is the average data transmission rate, R [bps] is the data transmission rate in SOT section, E is SOT section ratio, Lon [m] is the length of effective section and Loff [m] is the length of ineffective section.

Figure 8B:
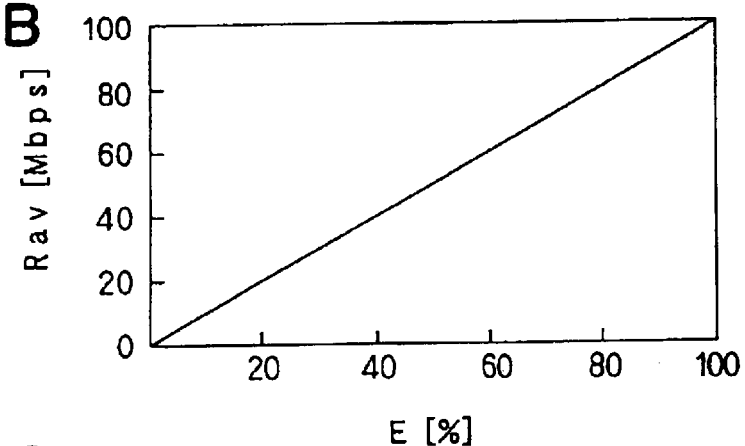
FIG. 8B shows an average data transmission rate in spot access method and FIG. 8C shows a margin as a function of a distance between an antenna of the base station and an antenna of wireless terminal.

The average data transmission rate according to the spot access method based on the above assumption is shown in FIG. 8B.

As a result, it is found that the data transmission rate of 2 Mbps according to the continuous access method can be exceeded, if SOT section ratio is equal to or greater than 2%. It is found that the disposal of the communication area based on the above assumption with SOT section ratio of 2% makes it possible to get a transmission rate exceeding the continuous access method only by disposing the communication area every 100 m.

Additionally, the value of 2 Mbps used for the continuous access method is a value obtained in case that the propagation distance, i.e. the distance between the base station antenna ATk and the antenna ATt carried by the vehicle is 10 m. In case that the communication area is provided every 100 m in the continuous access method, maximum value of the transmission distance becomes 50 m so that the electric power margin decreases based on the expression described in (5).

Figure 8C:
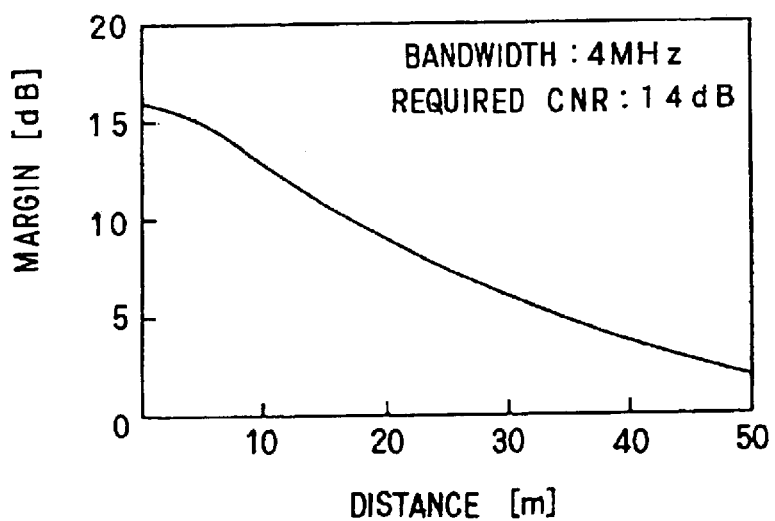

The variation of the electric power margin in accordance with the propagation distance in case of bandwidth 4 MHz according to the continuous access method is shown in FIG. 8C. Therefore, if the distance between the base stations is not set to 10–20 [m] and the distance between the base station antenna and the terminal station antenna is not set around 10 m, the margin that equals to that of the spot access method is thought to be not affordable. Therefore, the spot access method is thought to be superior to the continuous access method from the viewpoint of infrastructure costs.

Figure 4A:
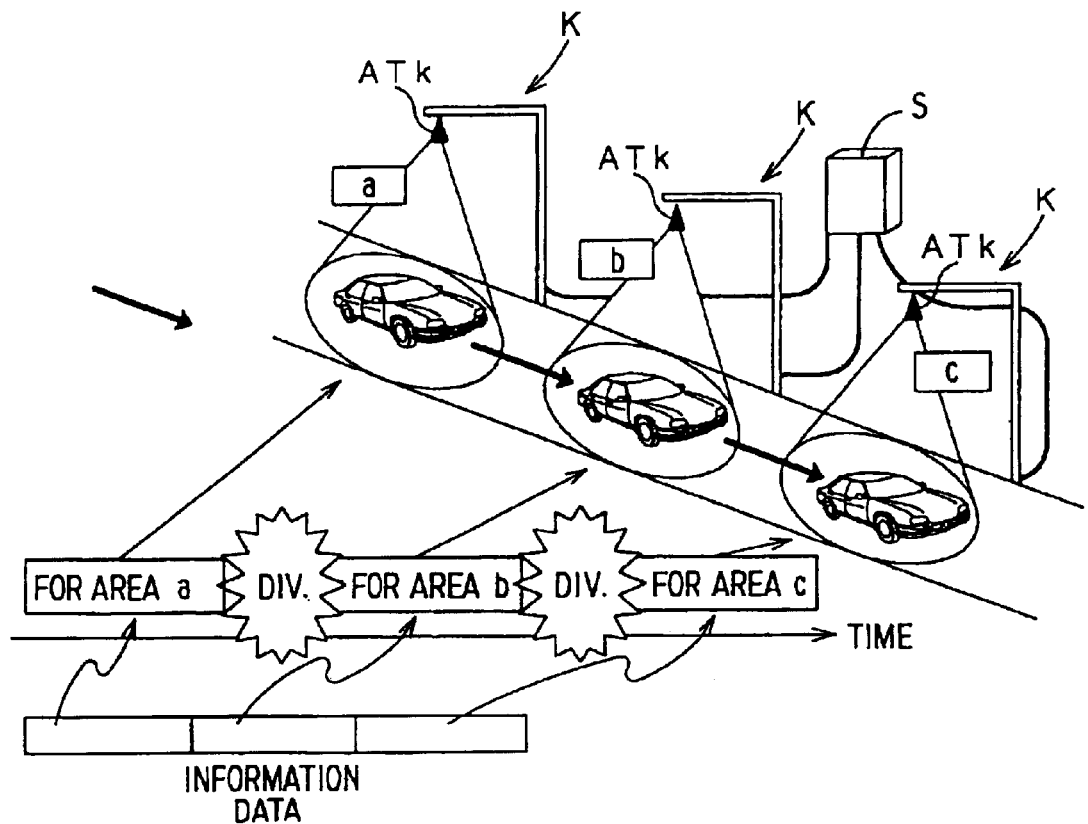
FIGS. 4A and 4B show a scheme in base station side and terminal station side by means of data division.

(6) Additionally, in this system, the terminal station T comes in or goes out the communication area intermittently with the traveling of the vehicle as described above and the data communication is carried out between the base station K during the stay in the communication area. In a communication such as according to the spot access method, the amount of data to be exchanged is assumed that it may have an extent which cannot be transmitted during the period of a stay in one communication area. In such a case it is preferable to perform a divided data transmission from plural base stations K as shown in FIG. 4A.

In divided transmission, information is divided in the control station S and packetized. A packet is so small that the transmission can be completed in one communication area. With reference to the example of FIG. 4A, it is divided into three parts bound for the communication areas a, b and c. Each part is transmitted to three base stations K. In each base station K, the terminal station T initiates transmission at the time when it enters each communication area. The terminal station T extracts the transmitted packet by radio wave demodulation and picks up the original information by reprocessing. Afterwards the divided data is coupled and used for example in the application processing at the terminal station T.

In addition, while the process of down-link is described as above, up-link is performed by similar process. That is, when uploading data from the terminal station T, the data is divided and transmitted to the base station K in orderly sequence to plural communication areas. The base stations K transmit the received divided data to the control station S, respectively, and the transmitted data is coupled and re-constructed in the control station S.

As described above, considering the divided transmission of data from plural base stations K to the terminal station T and premising that the data transmission rate during a stay in one communication area can be enhanced, a buffering memory having a large storage capacity is preferably used to make it possible to use successive data in the terminal station T even by intermittent data transmission. That is, moving image such as for example stream video or stream radio delivered from the Internet becomes visible and audible. In addition, if delay of a certain extent can be permitted, real time image or voice can be downloaded or uploaded. For example, live programs in current ground wave television are also a "real time" broadcast with a delay of several seconds. This delay is employed for jamming the inappropriate expression and the data application in real time becomes possible.

Here, a required buffering capacity of the memory and the number of communication areas is examined, respectively, which the terminal station T should set up in order that the interruption does not occur in data application in the terminal station T even if the data is transmitted intermittently to the terminal station T from the base station K.

(6-1) Required Capacity of the Buffering Memory

Figure 4B:
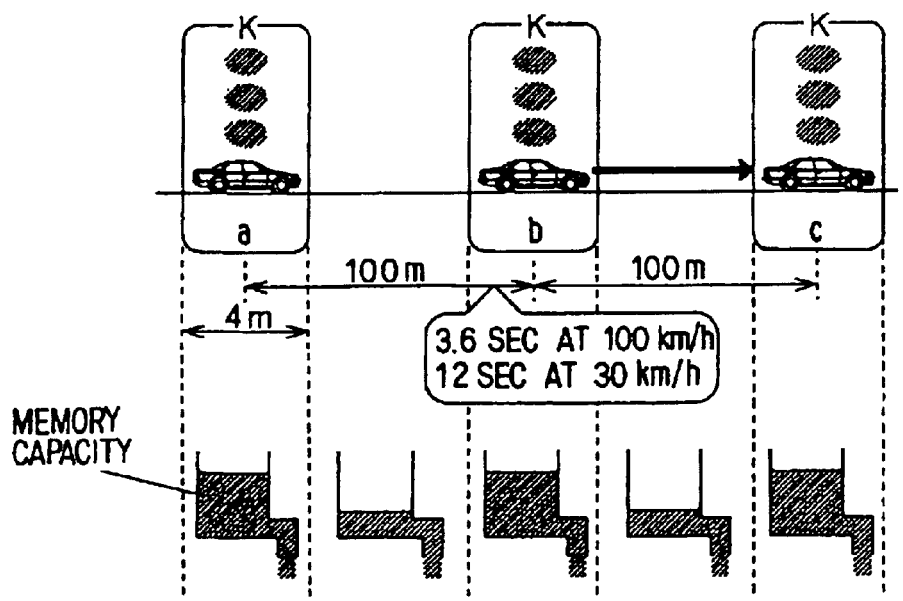

It is necessary for divided data transmission to provide data storage means (data storage medium) at the terminal station T to accumulate the transmitted divided data. However, the data storage capability (capacity of the buffering memory) to enable successive data application even by such intermittent data transmission is set as follows (FIG. 4B).

Here, R is the playing rate in the terminal station and v is the given velocity of the vehicle while the terminal station moves between the communication area performing the divided data transmission. Assuming that the space between adjacent communication areas K is L, T: the duration while data is not transmitted (non-transmission time) becomes L/v. Therefore, given the data storage capacity equal to or more than the value (=R×T) which is a product of R and T, no inconvenience is produced in data application for non-transmission time at the terminal station T. Of course it is preferable to have a large data storage capacity. This means that the above successive data application is made possible with that capacity as a minimum in relation to costs.

In addition, as for the assumed velocity of the vehicle v, since here is premised that the terminal station is carried by a vehicle and the vehicle runs on a road, it may be established with reference to the legal velocity or by examining the mean running velocity in reality. For example, if the distance between the communication areas is 100 m, the non-transmission time t becomes 3.6 seconds in case of running at 100 km/h and the non-transmission time t becomes 12 seconds in case of running at 30 km/h.

(6-2) Number of Communication Areas

Despite that there is sufficient data storage capacity in the terminal station as described above, if the adequate amount of data is not transmitted from the base station K, successive data application becomes impossible even by the intermittent data transmission as follows.

As a precondition, the running velocity of a vehicle carrying the terminal station is assumed to be fixed. If a running velocity is fixed, SOT section and SNT section of the communication are recurrently repeated according to the spot access method. Therefore, in order to eliminate the interruption during the data application, the amount of data that the terminal station is provided from the base station K during one period must be equal to or greater than the amount of data used in the terminal station. Such SOT ratio is examined as follow.

At first, the length L [m] which a vehicle runs in one cycle is expressed as follows by means of SOT length Lon [m] and SNT length Loff [m].

$$L = Lon + Loff$$

The cycle T [sec] is expressed as follows by this distance L and vehicle velocity v [m/sec].

$$T = L/v = (Lon + Loff)/v$$

RaREQ [bps] is the data transmission rate necessary for performing the data application in the terminal station T without interruption. Then, the amount of data bREQ [bits] required in one cycle is expressed as follows.

$$bREQ = RaREQ \cdot T = RaREQ(Lon+Loff)/v$$

Next, the amount of data b0b [bits] provided within one cycle is determined. When RaSA [bps] denotes the data transmission rate in SOT section and TON denotes the stay duration of SOT in one cycle, it is expressed as follows.

$$b0b = RaSA \cdot TON = RaSA(Lon/v)$$

As described above, the condition that the amount of data obtained becomes equal to or greater than that used in one cycle is expressed as follows.

$$b0b \geq bREQ$$

$$\rightarrow RaSA(Lon/v) \geq RaREQ(Lon+Loff)/v$$

$$\rightarrow Lon/(Lon+Loff) \geq RaREQ/RaSA$$

As the left-hand term of this last expression is the definition of effective section ratio E, the following condition can be led finally.

$$E \geq RaREQ/RaSA$$

That is, given the data transmission rate RaREQ [bps] required for data application at the terminal station T without interruption and determined the data transmission data rate RaSA [bps] in SOT, the base station K must be disposed such that the communication area the number of communication areas satisfies the above expression. For example, if the data transmission rate RaREQ required for data application is 1 M [bps] and the data transmission rate RaSA is 10 M [bps], making SOT section ratio E greater than 0.1, data application can be performed without interruption in the application at the terminal station T.

(7) Advantage of the Spot Communication Method

Normal cellular communication is intended for a person. As a person moves on the ground two-dimensionally, in order to cover the service area by personal communication area, it is necessary to arrange the personal communication area in two dimensions equally and to determine the communication area for transmitting the data by predicting the movement of a person. Since basically a person does not move straight and at his pleasure changes the course irregularly for keeping off other people. Therefore, the forecast of the communication area is difficult. However, since the vehicle travels on a road. Therefore, if the position and the velocity of the vehicle are grasped by RSU (Road Side Unit), it may be possible to forecast the communication area used for the transmission. Therefore, the present system according to the spot access method is advantageous to the communication between a vehicle and a roadside.

While having such an advantage, the system has a possibility of increasing the infrastructure costs due to the arrangement of many personal communication areas in comparison with the system using normal cellular method. Therefore, in addition to the enlargement of the space between the communication areas as large as possible by keeping the number of communication areas capable of holding a superiority to the continuos access method, introduction of combined ROF (radio-on-fiber) technology as described below is supposed to contribute to the reduction of infrastructure costs. This combined ROF technology makes the base station K "an outlet of radio wave." As one control station S takes care of the control of plural base stations K, it has an advantage in the aspect of costs. This block diagram is explained with reference to FIG. 9.

Figure 9:
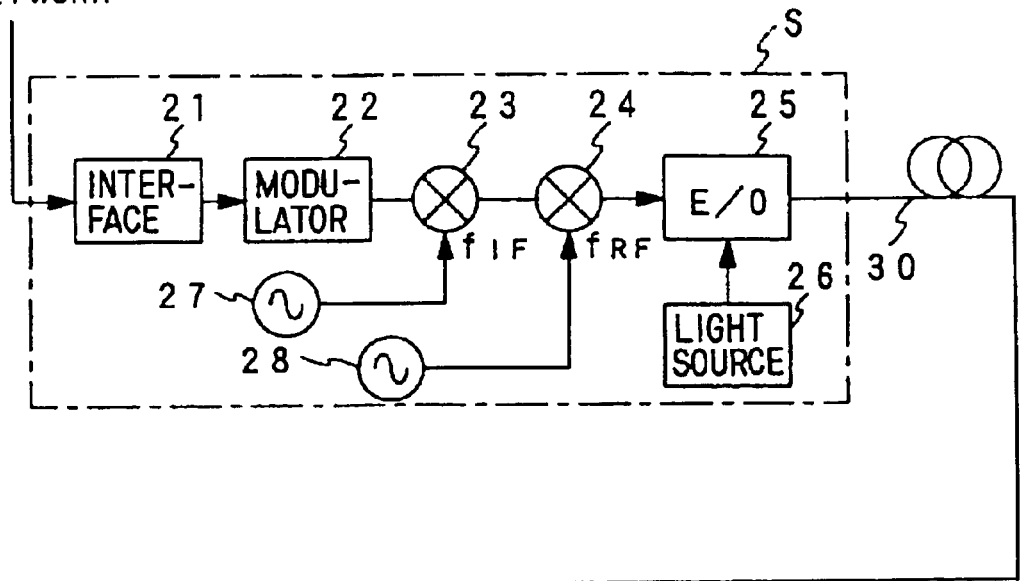
FIG. 9 shows a configuration of the control station and the base station in case of adopting the combined Radio-on-Fiber (ROF) technology.
Figure 9:
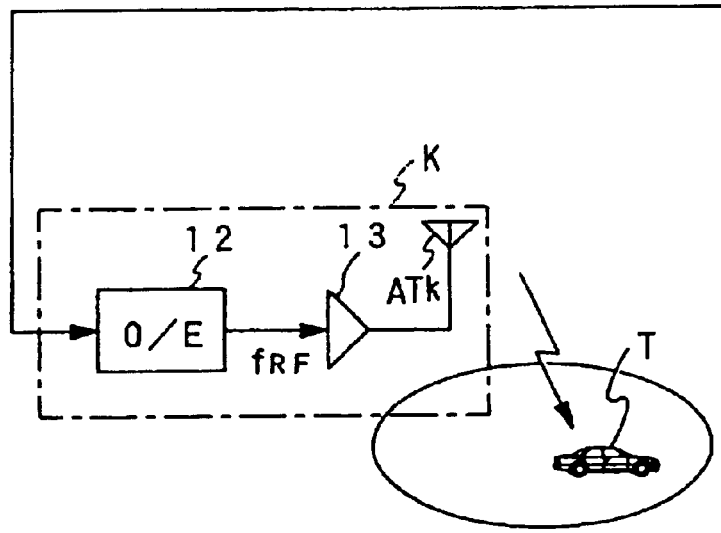

The control station S controls the interface between the base station K and the external communication network. Therefore, the control station S is comprised of, as shown in FIG. 9, an interface 21 connected to the external communication network for extracting the down-link signal addressed to the base station k, a modulator 22 for generating a modulated signal based on the down-link signal extracted by the interface 21, a local oscillator 27 for generating a first local signal of intermediate frequency band (IF signal), a mixer 23 for generating a signal of intermediate frequency band which is generated by mixing the modulated signal from the modulator 22 and the local signal from the local oscillator 27 to modulate the local signal by the modulated signal, a local oscillator 28 for generating a second local signal of RF band, a mixer 24 for generating transmission signal of RF band (RF signal) by mixing the IF signal generated by the mixer 23 and the second local signal from the local oscillator 28.

The control station S is further comprised of an electro-optical conversion device (E/O) 25 for modulating the intensity of light generated from light source 26 such as a laser device. It is comprised to be able to supply an optical signal amplified by an optical amplifier to the base station K through an optical fiber 30 as an optical transmission line.

On the other hand, the base station K is comprised of an opto-electrical conversion device (O/E) 12 for converting the light signal supplied through the optical fiber 30 into an electrical signal to re-construct transmission signal, an amplifier 13 to amplify the transmission signal re-constructed by O/E device 12 and a transmitting antenna ATk for converting the signal amplified by the amplifier 13 into radio wave for emitting.

In the system of this architecture, the control station S generates the IF signal superimposed with down-link signal and upconverts it by mixing the second local signal to generate transmission signal of RF band (RF signal) and generate intensity-modulated light by the transmission signal. On the other hand, the base station K re-constructs the transmission signal by converting the light signal into electrical signal and sends the re-constructed signal after having amplified by the amplifier 13 from the transmitting antenna ATk as it is.

Here, as for the up-link signal, signal processing is executed in reverse. That is, the base station K receives the transmitted RF signal from the terminal station T and converts it into light signal for the transmission to the control station S. In the control station S, original RF signal is extracted from the light signal transmitted by the base station K and the extracted RF signal is converted into the signal for external communication network.

In addition, in FIG. 9, only one of the base stations K is connected to the control station S, but as shown in FIGS. 1A and 1B, plural base stations k are connected to the control station S in practice. Therefore, in this case, a plurality of sets is provided for the modulator 22, two local oscillators 27, 28, two mixers 23, 24, E/O 25 and the light source 26. In addition, as for the two local oscillators 27, 28 and the light source 26, with the usage of a distributor, a plurality of sets can be reduced to one set. Furthermore, based on the premise that the signal transmission for plural base stations K is performed according to a broadcast type, only one set of the above each device is enough so that it is realized by making optical fiber 30 diverge.

This construction results in that provision of a local oscillator or a mixer for each base station K is not required and the millimeter wave device can be reduced to a minimum. Therefore, the architecture of the base station K becomes very simple and it becomes possible to be consisted in small size.

In the above embodiment, the communication area of the base station K is characterized in that it has the size in which a plurality of terminal stations T cannot exist simultaneously and that the communication areas do not overlap with each other. Since plural terminal stations do not exist in one communication area simultaneously, it is not necessary to perform multiple access such as by time division or frequency division so that one terminal station can use the whole band and all the communication time which are given to one communication area. Thus, broad band communication is made possible. In addition, as the communication areas do not overlap with each other, the whole bandwidth given to the system can be utilized in every communication area, thereby enabling broad band communication. Therefore, data transmission rate can be increased in comparison with the communication method such as cellular communication and also the number of communication areas of the base stations K can be reduced.

[Modification]

(1) In the above embodiment, the antenna position of the base station K along the widthwise direction of the road is set such that the carrier wave can be emitted from approximately right above the terminal station antenna ATt installed in the upper portion of the vehicle as shown in FIG. 1B. This is for the purpose of evading the shadowing to the carrier wave beam from the base station K caused by a large number of vehicles running in the neighborhood of the vehicle concerned (for example, running on the next driving lane) or signposts. However, if such a shadowing can be evaded, the structure may alternatively be comprised as follows.

Figure 10A:
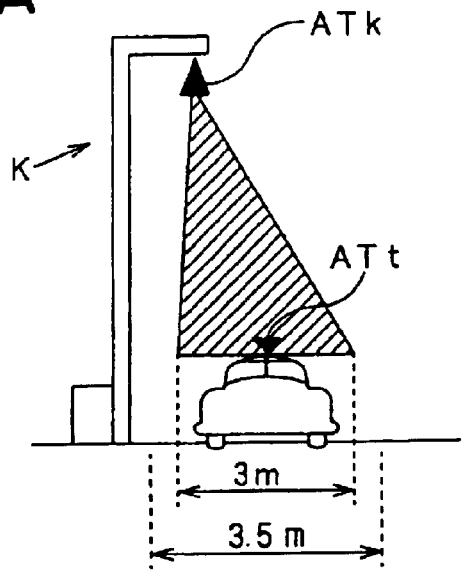
FIGS. 10A and 10B show a modification of formation of a beam emitted from the base station.
Figure 10B:
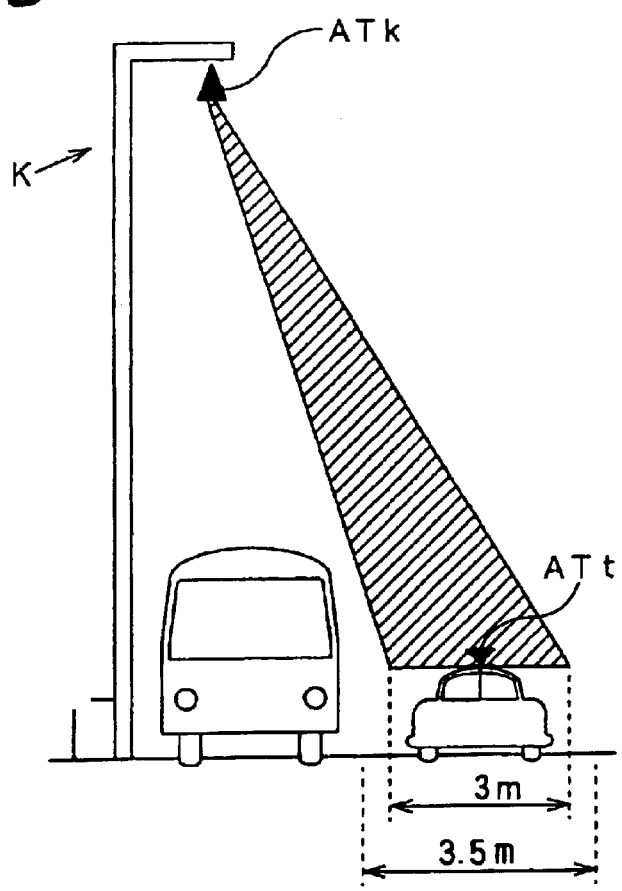

For example, as shown in FIG. 10A, the base station antenna ATk is brought close to the roadside and the beam is formed diagonally from above the vehicle. In addition, it can be constructed as shown in FIG. 10B for a spaced-apart traffic lane from the roadside. That is, even if it is assumed that the beam direction becomes diagonal as the result of lifting the position of the base station antenna ATk relatively, it does not cause any problem by means of the evasion of the shadowing by a large-sized vehicle running on a traffic lane near the roadside. Of course, forming the beam from right above like in FIG. 1B, it is advantageous that the antenna bearing height is low and the antenna mast for installing the antenna is short.

(2) In addition, as for the antenna, array antenna 50 illustrated in FIG. 11 can be adopted. This antenna 50 comprises a plurality of antenna elements 50a arranged in rows. Since it is difficult for a general antenna to control its directivity, the communication area which the base station K forms is necessarily fixed. To the contrary, as the array antenna 50 is comprised of a plurality of antenna elements 50a, it can control the directivity of carrier wave beam. Therefore, the following advantages can be provided.

Figure 11A:
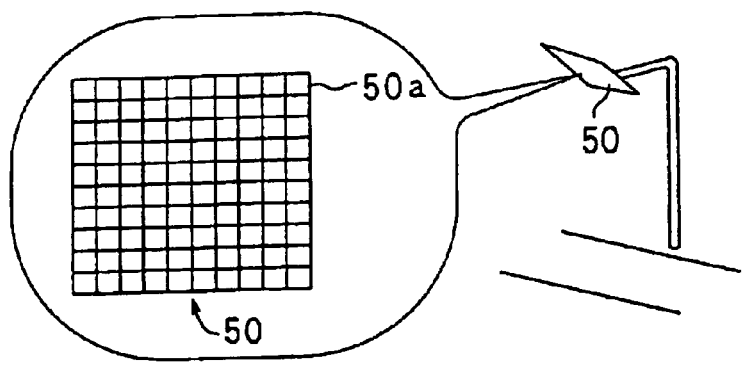
FIGS. 11A–11D show usage and effects in case of using array antenna.
Figure 11B:
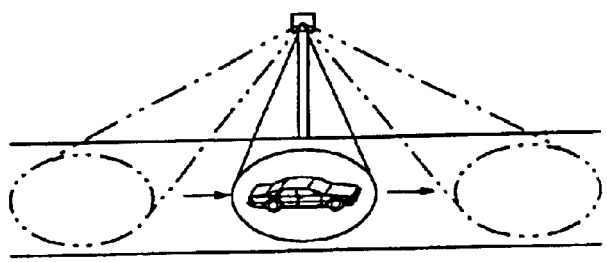

(a) In case of performing the transmission from the terminal station to the base station K through the array antenna 50, the communication area can be moved according to the position of the moving terminal station as shown in FIG. 11B. Therefore, long communication time can be secured in one communication area while keeping the narrow beam irradiation range and the high power density (i.e. broad band communication area) in comparison with the case with the use of the general antenna.

In addition, considering the case of transmission from the terminal station T to the base station K, since the communication area can be moved according to the position of the moving terminal station T as shown in FIG. 11B, a long communication time can be secured still in one communication area. Furthermore, as the communication area can be made narrow, for the base station K it goes along without receiving the wave coming from unnecessary direction and also the advantage of enhancing the communication quality can be obtained.

Figure 11C:
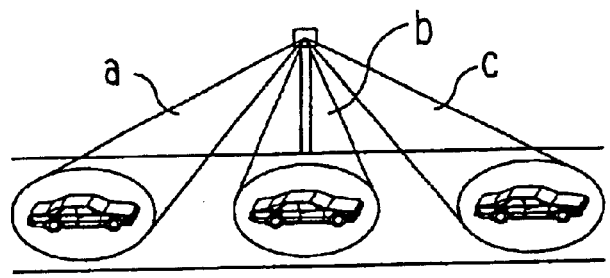
Figure 11D:
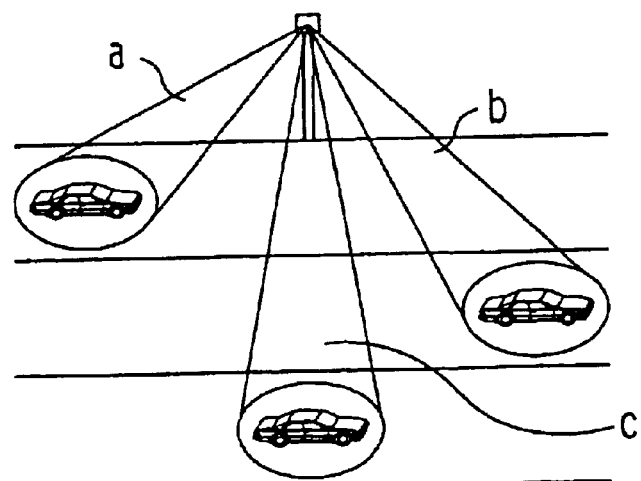

(b) In the case of general antenna, without an arrangement of plural antennas, communication areas cannot be formed in a plurality of locations over the plural traffic lane or the same traffic lane. On the other hand, in case with the use of array antenna 50 as shown in FIG. 11C, it is possible to form as shown in FIG. 11D three communication areas a, b and c over the same traffic lane simultaneously or over plural traffic lanes simultaneously.

Figure 12A:
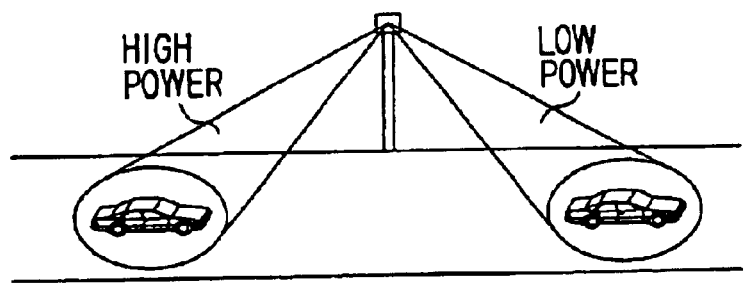
FIGS. 12A–12C show usage and effects in case of using array antenna.

(c) In addition, communication area can be formed with the optimum power density in accordance with a given communication data rate. That is, as illustrated in FIG. 12A, the communication area can be formed with high power density for a user (terminal station) requiring broad band communication and the communication area can be formed with low power density for a user (terminal station) requiring narrow band communication. As thus constructed, the receiving power defect in the terminal station or the excess electric power emission from the base station K can be prevented.

Figure 12B:
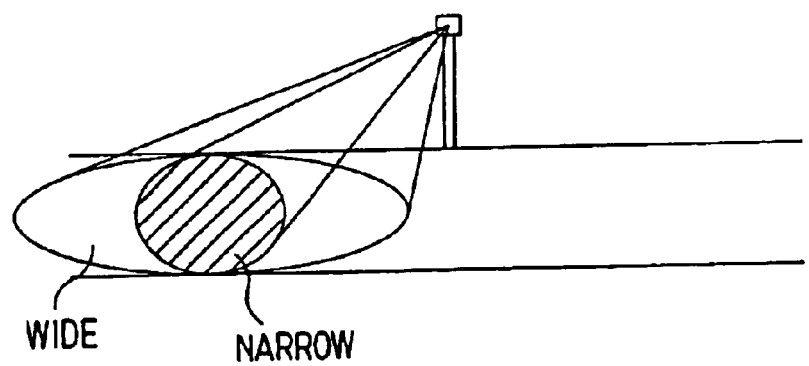

(d) In case of array antenna 50, geometry in itself of the communication area can be controlled. That is, as shown in FIG. 12B, using the same array antenna 50, it is possible to form a wide communication area at a time or a narrow communication area at another time. Therefore, if under the situation of other terminal station being not in the traveling direction, it may be possible to form a wide (i.e., long in traveling direction) communication area to secure a long communication time.

In the case that the array antenna is used in the terminal station T, the following advantages are provided.

Figure 12C:
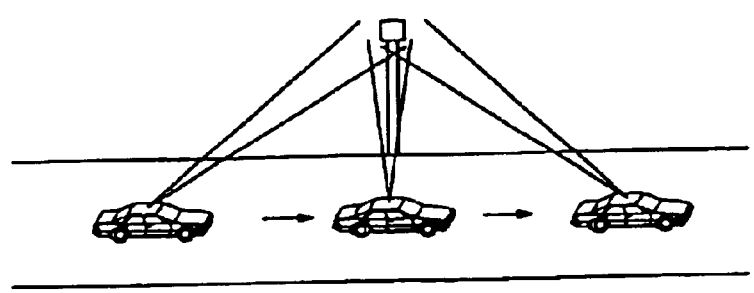

(a) In case of performing a transmission from the terminal station T to the base station K over the array antenna 50, as the transmission direction can be changed according to the relative position of the base station side antenna from the moving terminal station as shown in FIG. 12C, a long communication time can be secured in one communication area. Furthermore, as it goes along with narrow communication area, for the terminal station it is needless to receive the wave coming from unnecessary direction and also the advantage of enhancing the communication quality can be obtained.

(b) In this case also like in the case of installing in the base station K, it is possible to form a communication area with the optimum power density corresponding to the given communication data rate. Thus, the receiving power defect in the terminal station or the excess electric power emission from the base station K can be prevented.

(3) In the embodiment shown in FIG. 9, the combined ROF technology is used. This technology may be used in three representative patterns, that is, (i) RF signal transmission by ROF, (ii) intermediate frequency transmission by ROF and (iii) base band signal transmission by ROF. The up-link signal and the down-link signal may be realized either with the same pattern or different patterns. The pattern (i) is assumed in FIG. 9, but including this case here, the general architecture corresponding to the patterns of (i) to (iii) and the signal flow of the up-link and down-link directions are described in the following.

Figure 13A:
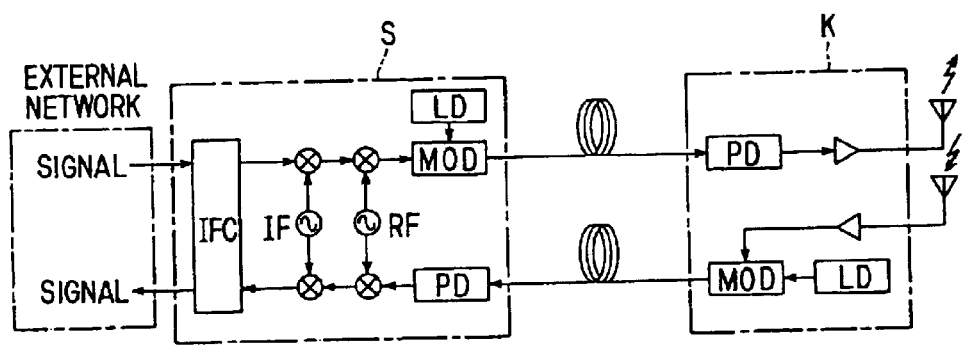
FIGS. 13A and 13B show configuration examples of ROF technology.

(i) In Case of RF Signal Transmission by ROF:

In this case, the architecture may be as shown in FIG. 13A. In this figure, LD denotes a light source, MOD denotes an optical modulator and PD denotes a photo diode which operates as opto-electric converter (O/E) that picks up electrical signal from the intensity modulated light signal. Flow of the signal in this architecture is as follows.

At first, as for the down-link direction, a wire communication signal transmitted from the external communication network undergoes data processing for radio transmission at an interface circuit in the control station S and thereafter modulated by a radio frequency to generate a base band signal. The base band signal is upconverted into an intermediate frequency IF (for example, 1 GHz) and afterwards upconverted into radio frequency RF (for example, 37 GHz or 60 GHz). Then, the light generated from the light source LD undergoes intensity modulation by the RF signal by the optical modulator MOD and the modulated light signal is transmitted toward the base station K through optical fiber.

In the base station K, the RF signal is extracted from the light signal by O/E and it is amplified by an RF amplifier to be emitted from the antenna to the air for transmission to the terminal station.

On the other hand, as for the up-link direction, the base station K that received a RF signal emitted by the terminal station T through the antenna Att modulates light in its intensity with this RF signal by the optical modulator MOD and transmits the light through optical fiber to the control station S. In the control station S, the RF signal is extracted from the light signal by O/E and downconverted into the base band signal by way of the intermediate frequency IF. The RF signal undergoes radio wave demodulation or data conversion at the interface circuit IFC to extract the wire communication signal, and it is connected to the external communication network.

The feature in the case of this architecture is that the architecture of the base station K is simplified very much.

Figure 13B:
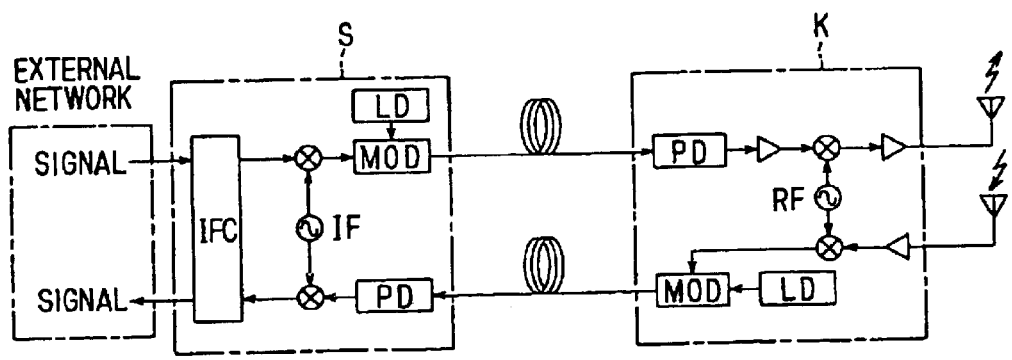

(ii) In Case of IF Signal Transmission by ROF:

In this case, the architecture may be as shown in FIG. 13B. At first, as for the down-link direction, a wire communication signal transmitted from an external communication network undergoes data processing for radio transmission by an interface circuit IFC in the control station S and thereafter modulated with radio frequency to generate base band signal. The base band signal is upconverted into intermediate frequency IF. Then, the light generated from the light source LD undergoes intensity modulation by the base band signal by means of the optical modulator MOD and the modulated light signal is transmitted toward the base station K through an optical fiber.

In the base station K, IF signal is extracted from the light signal transmitted from the control station S by O/E and after upconverted into RF signal, it is amplified by an RF amplifier to be emitted from the antenna to the terminal station.

On the other hand, as for the up-link direction, the base station K that received RF signal emitted by the terminal station through the antenna Att downconverts the received RF signal into IF signal and modulates light in its intensity by this IF signal by the optical modulator MOD and transmits the light through optical fiber to the control station S. In the control station S, IF signal is extracted from the light signal by O/E and downconverted into a base band signal. The base band signal undergoes radio wave demodulation or data conversion by the interface circuit IFC to extract the wire communication signal and it is connected to the external communication network.

In the case of this architecture, since the high frequency operation characteristics of the optical modulator is possible at about the intermediate frequency IF, a more inexpensive device can be employed to be able to lead the total reduction in cost.

(iii) In Case of Base Band Signal Transmission by ROF

Figure 14A:
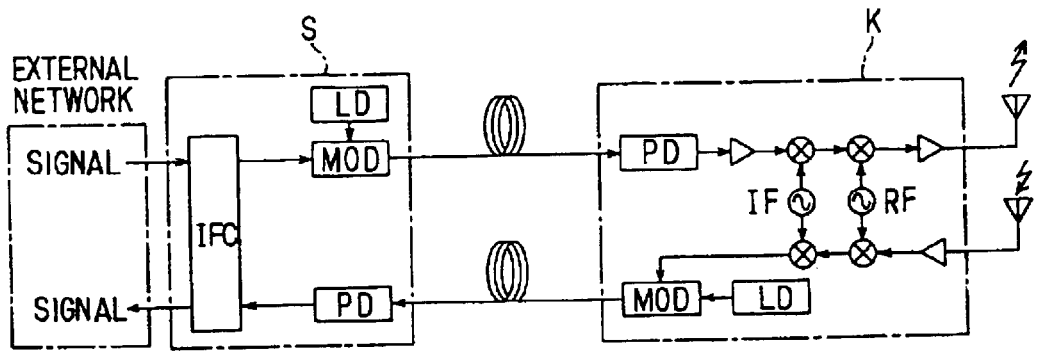
FIGS. 14A and 14B show configuration examples of ROF technology with base band signal.

In this case, the architecture may be as shown in FIG. 14A.

At first, as for the down-link direction, a wire communication signal transmitted from an external communication network undergoes data processing for radio transmission by the interface circuit IFC in the control station S and thereafter modulated into the radio as a base band signal. Then, the light generated from the light source LD undergoes intensity modulation with the base band signal by the optical modulator MOD and the modulated light signal is transmitted toward the base station K through the optical fiber. In the base station K, the base band signal is extracted from the light signal transmitted from the control station S by O/E and after upconverted into a RF signal by way of the intermediate frequency, it is amplified by RF amplifier to be emitted from the antenna to the terminal station T.

On the other hand, as for the up-link direction, the base station K that received a RF signal emitted from the terminal station through the antenna downconverts the received RF signal into a base band signal by way of intermediate frequency IF and modulates light in its intensity by this base band signal at the optical modulator MOD and transmits the light through optical fiber to the control station S. In the control station S, a base band signal is extracted from the light signal by O/E and the base band signal undergoes radio wave demodulation or data conversion by the interface circuit IFC to extract a wired communication signal and it is connected to the external communication network.

Figure 14B:
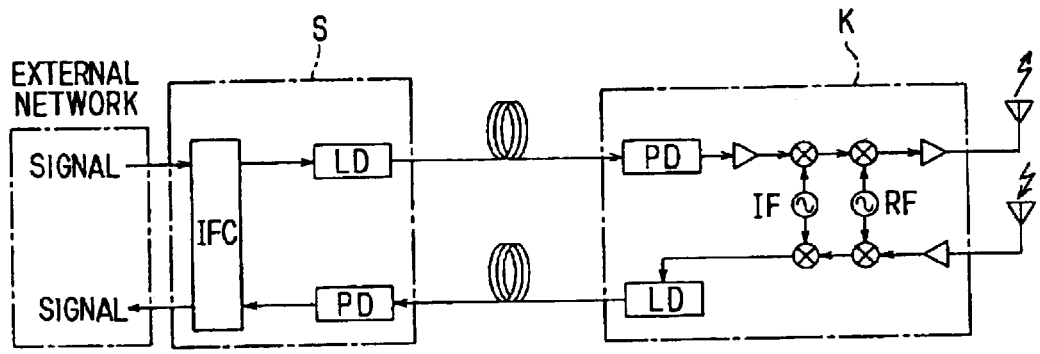
Figure 14C:
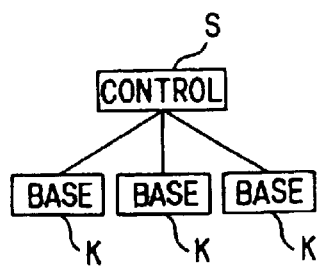
FIGS. 14C and 14D show connection forms between a control station and base stations.

In the case of this architecture, as the high frequency operation characteristics of the optical modulator is possible with a base band signal extent, more inexpensive device can be employed so as to be able to lead the total reduction in cost. In addition, it is made possible to realize without optical modulator in case of using modulation functioned LD. The architecture of that case is shown in FIG. 14B.

Figure 14D:
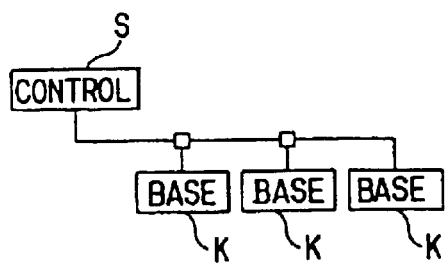

(4) In the above embodiment, the connection form between the plural base station K and the control station S as a network architecture is made of "tree structure type" centered around the control station S. However, "bus network type" as shown in FIG. 14D can be used alternatively in which each base station K is connected serially. In the system of this bus network type, combined ROF technology is used in each base station K and the optical carrier transmitted to each base station K can be comprised of WDM (Wavelength Division Multiplex) method that differs the optical wavelength in accordance with individual base station K. In the system of tree structure type, the light transmitted to all of the base stations K can get along with the same wavelength but the number of the optical fiber systems to be laid increases so that the infrastructure cost has a possibility of becoming relatively high. To the contrary, in the system of the bus network type, optical fiber system can get along with one system.

(5) In the above embodiment, the communication system between a vehicle and a roadside is nominated as one example of wireless communication system. It is also assumed that a vehicle is a vehicle, a road is a traveling route, and a traffic lane as a traffic lane. However, even a vehicle other than a vehicle can also be adapted in the system of the invention so far as it being the one having a similar function with the vehicle in respect to the road or traffic lane.

The present invention should not be limited to the above embodiment and its modifications, but may be implemented in many other ways without departing from the spirit of the invention.

What is claimed is:

1. A wireless communication system comprising:
a plurality of base stations separated from each other by a predetermined distance along a traveling route of a vehicle and having respective communication areas; and
a terminal station carried by a vehicle for wireless communication with the base stations when entering the communication areas of the base stations,
wherein each communication area of the base stations is sized to cover generally only one vehicle to exist therein and the communication areas are separated from one another without overlapping, wherein:
data is dividedly transmitted in the communication areas of the base stations existing along a traveling direction of the vehicle in case that transmission of the data to the terminal station is not completed within the communication area of each base station;
the terminal station includes data storage means for accumulating the data transmitted dividedly; and
the data storage means has a data storage capacity which is more than a value R×T which is a product of R and T, R representing playing data rate at the terminal station and T (=L/v) representing non-data transmission time determined by a velocity v at which the terminal station moves between adjacent communication areas divisionally transmitting the data and the distance L between the adjacent communication areas.

2. The wireless communication system as in claim 1, wherein:
the communication area has a greatest possible size which is incapable of covering a plurality of vehicles therein.

3. The wireless communication system as in claim 1, wherein:
the number of communication areas of the base stations along the traveling route satisfies the following condition, $$E \geq RaREQ/RaSA \qquad \text{(condition)}$$

where E is an effective communication section ratio, RaREQ is a data transmission rate necessary for utilizing the data without interruption at the thermal station, and RaSA is the data transmission rate from the base station to the terminal station.

4. The wireless communication system as in claim 1, wherein:
a width of the communication area of the base station in a widthwise direction of the traveling route is set based on a width of a traffic lane of the traveling route.

5. The wireless communication system as in claim 1, wherein:
the plurality of base stations is connected to one control station through optical transmission line and the control station is connected to a wire communication network at the outside;
the control station receives, in down-link direction, a wire communication signal addressed to the terminal station from an outside and generates a base band signal by converting the wire communication signal and converting the base band signal into a high frequency signal, and thereafter modulates it to a light signal to transmit to the base station; and
the base station converts the light signal transmitted from the control station into an electrical signal to extract the high frequency signal, and transmits the extracted high frequency signal to the terminal station.

6. Wireless communication system as in claim 1, wherein:
the plurality of base stations is connected to one control station through optical transmission line and the control station is connected to a wire communication network at the outside;
the control station receives, in down-link direction, a wire communication signal addressed to the terminal station from an outside and generates a base band signal by converting the wire communication signal and converting the base band signal into an intermediate frequency signal, and thereafter modulates it to a light signal to transmit to the base station; and the base station converts the light signal transmitted from the control station into an electrical signal to extract the intermediate frequency signal, converts the extracted intermediate frequency signal into a high frequency signal, and transmits the high frequency signal to the terminal station.

7. The wireless communication system as in claim 1, wherein:
the plurality of base stations is connected to one control station through optical transmission line and the control station is connected to a wire communication network at the outside;
the control station receives, in a down-link direction, a wire communication signal addressed to the terminal station from an outside and generates a base band signal by converting the wire communication signal, and thereafter modulates it to a light signal to transmit to the base station; and
the base station converts the light signal transmitted from the control station into an electrical signal to extract the base band signal, converts the extracted base band signal to a high frequency signal, and transmits the high frequency signal to the terminal station.

8. The wireless communication system as in claim 1, wherein:
the plurality of base stations is connected to one control station through an optical transmission line and the control station is connected to a wire communication network at an outside;
the base station, in an up-link direction, receives a high frequency signal transmitted from the terminal station and converts it to a light signal to transmit to the control station; and
the control station extracts the original high frequency signal from the transmitted light signal and converts the extracted high frequency signal to a wire communication signal and connects to the wire communication network at the outside.

9. The wireless communication system as in claim 1, wherein:
the plurality of base stations is connected to one control station through an optical transmission line and the control station is connected to a wire communication network at an outside;
the base station, in an up-link direction, receives a high frequency signal transmitted from the terminal station and converts the high frequency signal into an intermediate frequency signal and modulates the intermediate frequency signal to a light signal to transmit to the control station; and
the control station extracts the original intermediate frequency signal from the transmitted light signal and converts the extracted intermediate frequency signal to a wire communication signal and connects to the wire communication network at the outside.

10. The wireless communication system as in claim 1, wherein:
the plurality of base stations is connected to one control station through an optical transmission line and the control station is connected to a wire communication network at an outside;
the base station, in an up-link direction, receives a high frequency signal transmitted from the terminal station and converts the high frequency signal into a base band signal and converts the base band signal into a light signal to transmit to the control station; and
the control station extracts the original base band signal from the transmitted light signal and converts the extracted base band signal to a wire communication signal and connects to the wire communication network at the outside.

11. The wireless communication system as in claim 1, wherein:
the plurality of base stations are connected with the control station in a star type.

12. The wireless communication system as in claim 1, wherein:
the base station has an array antenna having a plurality of antenna elements.

13. The wireless communication system as in claim 1, wherein:
the terminal station has an array antenna having a plurality of antenna elements.

14. The wireless communication system as in claim 1, wherein:
the plurality of base stations are connected with the control station in a bus network type.

15. The wireless communication system as in claim 14, wherein:
optical transmission between the plurality of base stations and the control station uses wavelength division multiplex type that multiplexes divisionally by differing wavelengths of a transmission light according to each base station.

16. The wireless communication system as in claim 1, wherein:
the traveling route includes a plurality of traffic lanes so that a plurality of vehicles can travel side by side; and
a width of the communication area of the base station in a widthwise direction of the traveling route is set based on a width of one traffic lane.

17. The wireless communication system as in claim 16, wherein:
the plurality of traffic lanes is directly adjacent to each other;and
the communication area is formed such that the communication areas for the plurality of traffic lanes are displaced in a traveling direction so as not to abut each other in a widthwise direction of the traveling route.

18. The wireless communication system as in claim 16, wherein:
the plurality of traffic lanes is directly adjacent without any intervening things; and
the communication areas of the plurality of traffic lanes are adjacent each other along the widthwise direction of the traveling route, and are separated from each other by a predetermined width such that the adjacent communication areas do not interfere each other.

19. The wireless communication system as in claim 16, wherein:
the base station transmits a carrier wave for forming the communication area from a certain direction such that it is not obstructed by vehicles moving on the traveling route or other structures on or around the traveling route.

20. The wireless communication system as in claim 19, wherein:
the base station transmits the carrier wave from approximately right above the traffic lane.

21. A wireless communication system comprising:
a plurality of base stations separated from each other by a predetermined distance along a traveling route of a vehicle and having respective communication areas; and a terminal station carried by a vehicle for wireless communication with the base stations when entering the communication areas of the base stations, wherein each communication area of the base stations is sized to cover generally only one vehicle to exist therein and the communication areas are separated from one another without overlapping, wherein:

the base station transmits the carrier wave for forming the communication area to an area where a frequency of the carrier wave received by the terminal station of the vehicle moving on the traveling route does not vary in discontinuity by means of Doppler effect, and the base station further transmits the carrier wave from approximately right below an antenna of the base station in only one of a traveling direction of the vehicle arid an opposite direction from the traveling direction of the vehicle along the traveling route of the vehicle.

22. A wireless communication system comprising:

a plurality of base stations separated from each other by a predetermined distance along a traveling route of a vehicle and having respective communication areas; and a terminal station carried by a vehicle for wireless communication with the base stations when entering the communication areas of the base stations, wherein each communication area of the base stations is sized to cover generally only one vehicle to exist therein and the communication areas are separated from one another without overlapping, wherein:

the number of communication areas of the base stations on the traveling route is set to satisfy the following condition, $$E > 10^{\{-(GtSA-GtCN)/10\}}$$

where E is an effective communication section ratio, GtSA is an antenna gain of the base station and GtCN is an antenna gain of the base station of continuous access method in which the communication areas overlap with each other, with "^" in the above expression being the power of numeric value before "^" to the number of times of the numeric value after "^".

23. A base station for wireless communication with a terminal station carried by a vehicle entering a communication area thereof, wherein:

the base station is separated from adjacent ones by a predetermined distance along a traveling route of the vehicle; and the communication area of the base station is sized to cover generally only one vehicle to exist therein and the communication area is separated from communication areas of adjacent communication areas without overlapping, wherein:

data is dividedly transmitted in the communication area of the base station existing along a traveling direction of the vehicle in case that transmission of the data to the terminal station is not completed within the communication area of each base station; and the number of communication areas of the base stations along the traveling route satisfies the following condition, $$E \geq RaREQ/RaSA \quad \text{(condition)}$$

where E is an effective communication section ratio, RaREQ is a data transmission rate necessary for utilizing the data without interruption at the terminal station, and RaSA is the data transmission rate from the base station to the terminal station.

24. The base station as in claim 23, wherein:

the communication area has a greatest possible size which is incapable of covering a plurality of vehicles therein.

25. The base station as in claim 23, wherein:

a width of the communication area of the base station in a widthwise direction of the traveling route is set based on a width of a traffic lane of the traveling route.

26. The base station as in claim 23, wherein:

the traveling route includes a plurality of traffic lanes so that a plurality of vehicles can travel side by side; and a width of the communication area of the base station in a widthwise direction of the traveling route is set based on a width of one traffic lane.

27. The base station as in claim 26, wherein:

the plurality of traffic lanes is directly adjacent to each other; and the communication area is formed such that the communication areas for the plurality of traffic lanes are displaced in a traveling direction so as not to abut each other in a widthwise direction of the traveling route.

28. The base station as in claim 26, wherein:

the plurality of traffic lanes is directly adjacent without any intervening things; and the communication areas of the plurality of traffic lanes are adjacent each other along the widthwise direction of the traveling route, and are separated from each other by a predetermined width such that the adjacent communication areas do not interfere each other.

29. The base station as in claim 26, wherein:

the base station transmits a carrier wave for forming the communication area from a certain direction such that it is not obstructed by vehicles moving on the traveling route or other structures on or around the traveling route.

30. The base station as in claim 29, wherein:

the base station transmits the carrier wave from approximately right above the traffic lane.

31. A base station A base station for wireless communication with a terminal station carried by a vehicle entering a communication area thereof, wherein:

the base station is separated from adjacent ones by a predetermined distance alone a traveling route of the vehicle; and the communication area of the base station is sized to cover generally only one vehicle to exist therein and the communication area is separated from communication areas of adjacent communication areas without overlapping, wherein:

the base station transmits the carrier wave for forming the communication area to an area where a frequency of the carrier wave received by the terminal station of the vehicle moving on the traveling route does not vary in discontinuity by means of Doppler effect, and the base station further transmits the carrier wave from approximately right below an antenna of the base station in only one of a traveling direction of the vehicle and an opposite direction from the traveling direction of the vehicle along the traveling route of the vehicle.

32. A base station for wireless communication with a terminal station carried by a vehicle entering a communication area thereof, wherein:

the base station is separated from adjacent ones by a predetermined distance along a traveling route of the vehicle; and the communication area of the base station is sized to cover generally only one vehicle to exist therein and the communication area is separated from communication areas of adjacent communication areas without overlapping, wherein:

the number of communication areas of the base stations on the traveling route is set to satisfy the following condition, $$E > 10^{\{-(GtSA-GtCN)/10\}}$$

where E is an effective communication section ratio, GtSA is an antenna gain of the base station and GtCN is an antenna gain of the base station of continuous access method in which the communication areas overlap with each other, with "^" in the above expression being the power of numeric value before "^" to the number of times of the numeric value after "^".

33. The base station as in claim 32, wherein:

the base station is connected through an optical transmission line to a control station, which receives a wire communication signal addressed to the terminal station from an outside and generates a base band signal by converting the wire communication signal and converting the base band signal into a high frequency signal, and thereafter modulates it to a light signal; and the base station, in a down-link direction, converts the light signal transmitted from the control station into an electrical signal to extract the high frequency signal, and transmits the extracted high frequency signal to the terminal station.

34. The base station as in claim 32, wherein:

the base station is connected through an optical transmission line to a control station, which receives a wire communication signal addressed to the terminal station from an outside and generates a base band signal by converting the wire communication signal to convert the base band signal into an intermediate frequency signal, and thereafter modulates it to a light signal; and the base station, in a down-link direction, converts the light signal transmitted from the control station into an electrical signal to extract the intermediate frequency signal, converts the extracted intermediate frequency signal into a high frequency signal, and transmits the high frequency signal to the terminal station.

35. The base station as in claim 32, wherein:

the base station is connected through an optical transmission line to a control station, which receives a wire communication signal addressed to the terminal station from an outside and generates a base band signal by converting the wire communication signal and thereafter modulates it to a light signal; and the base station, in a down-link direction, converts the light signal transmitted from the control station into an electrical signal to extract the base band signal, converts the extracted base band signal to a high frequency signal, and transmits the high frequency signal to the terminal station.

36. The base station as in claim 32, wherein:

the base station is connected through an optical transmission line to a control station, which extracts an original high frequency signal from a light signal and converts the extracted high frequency signal to a wire communication signal; and the base station, in an up-link direction, receives the high frequency signal transmitted from the terminal station, converts the received high frequency signal to a light signal, and transmits the light signal to the control station.

37. The base station as in claim 32, wherein:

the base station is connected through an optical transmission line to a control station, which extracts an original intermediate frequency signal from a light signal and converts the extracted intermediate frequency signal to a wire communication signal; and the base station, in an up-link direction, receives a high frequency signal from the terminal station and converts the high frequency signal into an intermediate frequency signal and modulates the intermediate frequency signal to a light signal to transmit to the control station.

38. The base station as in claim 32, wherein:

the base station is connected through an optical transmission line to a control station, which extracts an original base band signal from a light signal and converts the extracted base band signal to a wire communication signal; and the base station, in an up-link direction, receives a high frequency signal transmitted from the terminal station and converts the high frequency signal into a base band signal and converts the base band signal into a light signal to transmit to the control station.

39. A terminal station carried by a vehicle for wireless communication with a plurality of base stations separated from each other by a predetermined distance along a traveling route of the vehicle and capable of divisionally receiving given data from the plurality of base stations, the terminal station comprising:

data storage means for accumulating the data transmitted divisionally from the base stations, wherein the data storage means has a data storage capacity which is more than a value R×T which is a product of R and T, R representing a data rate used for transmission of the data at the terminal station and T(=L/v) representing non-data transmission time determined by a velocity v at which the terminal station moves between adjacent communication areas divisionally transmitting the data and the distance L between the adjacent communication areas.

* * * * *